United States Patent [19]
Ikegami

[11] Patent Number: 5,337,166
[45] Date of Patent: Aug. 9, 1994

[54] COLOR SIGNAL TRANSFORMING APPARATUS

[75] Inventor: Hiroaki Ikegami, Kanagawa, Japan

[73] Assignee: Fuji Xerox Co., Ltd., Tokyo, Japan

[21] Appl. No.: 16,830

[22] Filed: Feb. 12, 1993

Related U.S. Application Data

[63] Continuation-in-part of Ser. No. 962,502, Oct. 16, 1992, and Ser. No. 962,351, Oct. 16, 1992, Pat. No. 5,313,314.

[30] Foreign Application Priority Data

Feb. 14, 1992 [JP] Japan .................. 4-059224

[51] Int. Cl.$^5$ .............................. H04N 1/46
[52] U.S. Cl. ....................... 358/518; 358/520
[58] Field of Search .............. 358/518–525, 358/515

[56] References Cited

U.S. PATENT DOCUMENTS

| | | | |
|---|---|---|---|
| 4,745,466 | 5/1988 | Yoshida et al. | 358/518 |
| 4,876,589 | 10/1989 | Orsburn et al. | 358/520 |
| 5,077,605 | 12/1991 | Ikeda et al. | 358/521 |
| 5,313,314 | 5/1994 | Ikegami | 358/518 |

FOREIGN PATENT DOCUMENTS

| | | |
|---|---|---|
| 58-16180(B2) | 3/1983 | Japan . |
| 2-187374(A) | 7/1990 | Japan . |
| 3-296660 | 10/1991 | Japan . |
| 2053619 | 2/1981 | United Kingdom . |
| 1595122 | 7/1990 | United Kingdom . |

OTHER PUBLICATIONS

Patent Abstract of Japan, Appln. No. Hei. 3-296659, dated Apr. 30, 1993.
Patent Abstract of Japan, vol. 14, No. 469 of JPA 21 87 374 dated 23 Jul. 1990.
Patent Abstract of Japan, vol. 14, No. 255 of JPA 20 73 779 dated 13 Mar. 1990.
European Search Report dated May 10, 1993.

*Primary Examiner*—Stephen Brinich
*Attorney, Agent, or Firm*—Finnegan, Henderson, Farabow, Garrett & Dunner

[57] ABSTRACT

A color signal transforming apparatus of the type in which three or four input signals are each divided into higher bits and lower bits, and output signals are formed by calculating basic data obtained from the combinations of the higher bits and the combination of interpolation data obtained from the combinations of the higher bits and the lower bits. The color signal transforming apparatus comprises an address translation memory for receiving the combination of higher bits as an address signal and transforming the address signal to another address signal, correcting data storing unit for outputting a calculation signal for the lower bits in response to an address signal as the combination of the higher bits, and lower-bit correcting calculating unit for correcting the lower bits by using the output signal of the correcting data storing unit to remarkably reduce the total memory capacity required for a color signal transforming apparatus.

9 Claims, 18 Drawing Sheets

PROCESSING OF THE INTERPOLATION REGIONS OUTSIDE THE COLOR REPRODUCTION RANGE, AND INTEGRATION OF THE ADJACENT INTERPOLATION REGIONS

FIG. 6
OPERATION OF THE INVERSION 4:
INVERSION CONTROLLER
(a) INVERSION CONTROLLER FOR INTEGRATION OF THE REGIONS OF ONLY $2^n$
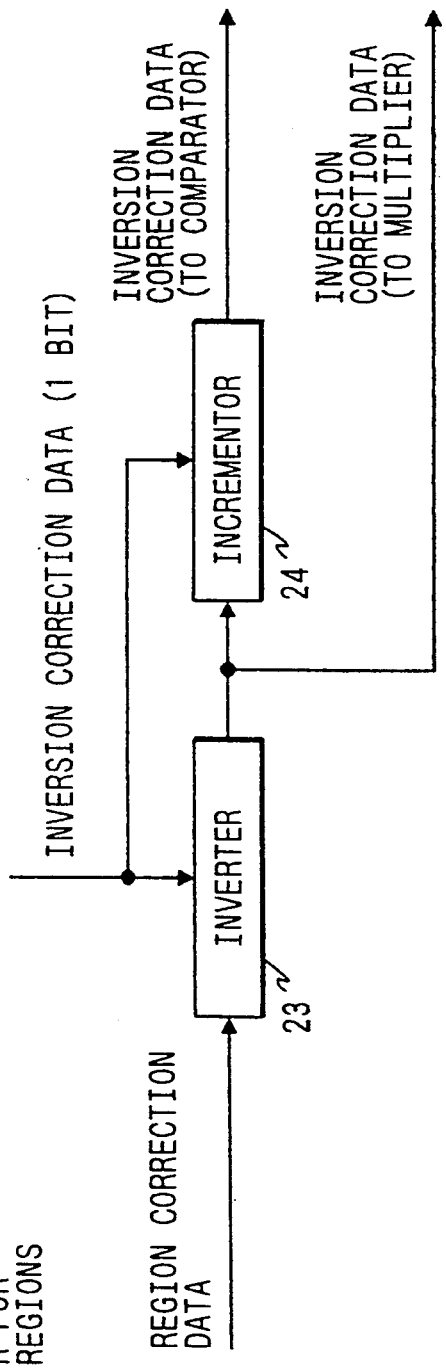
(b) INVERSION CONTROLLER FOR INTEGRATION OF OTHER NUMBER OF THE REGIONS THAN $2^n$
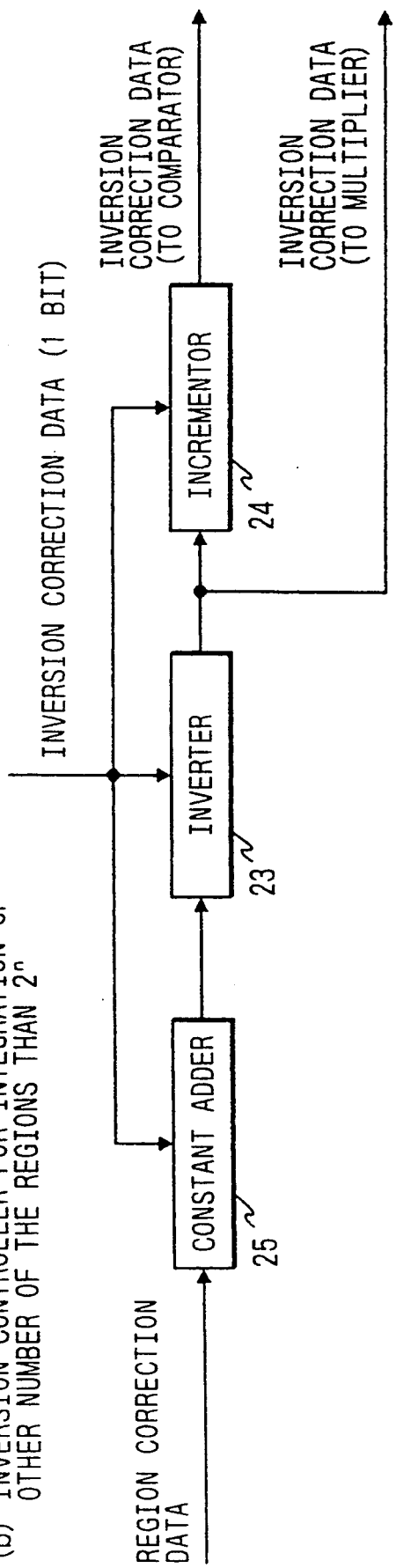

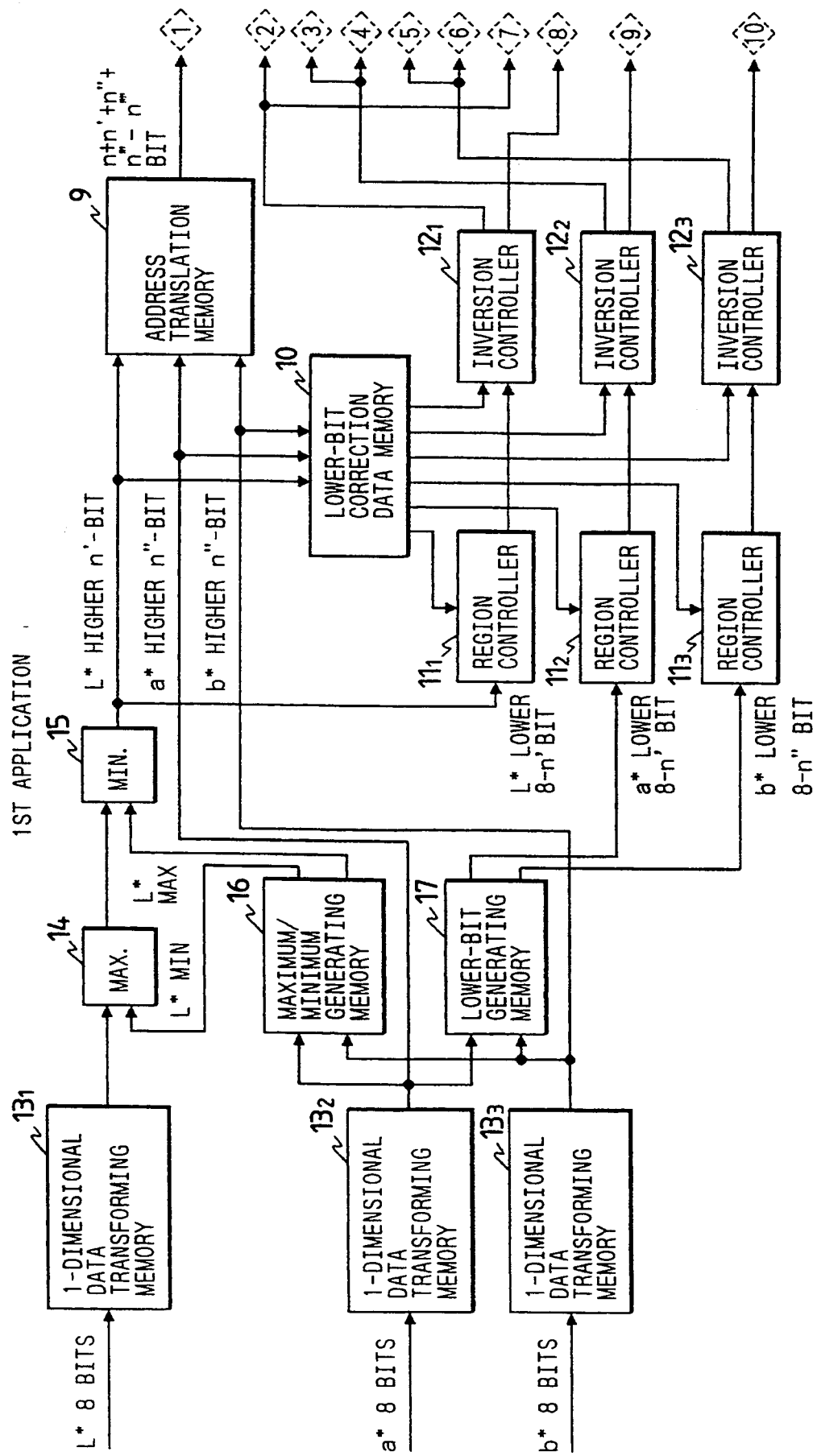
FIG. 9(a) 1ST APPLICATION

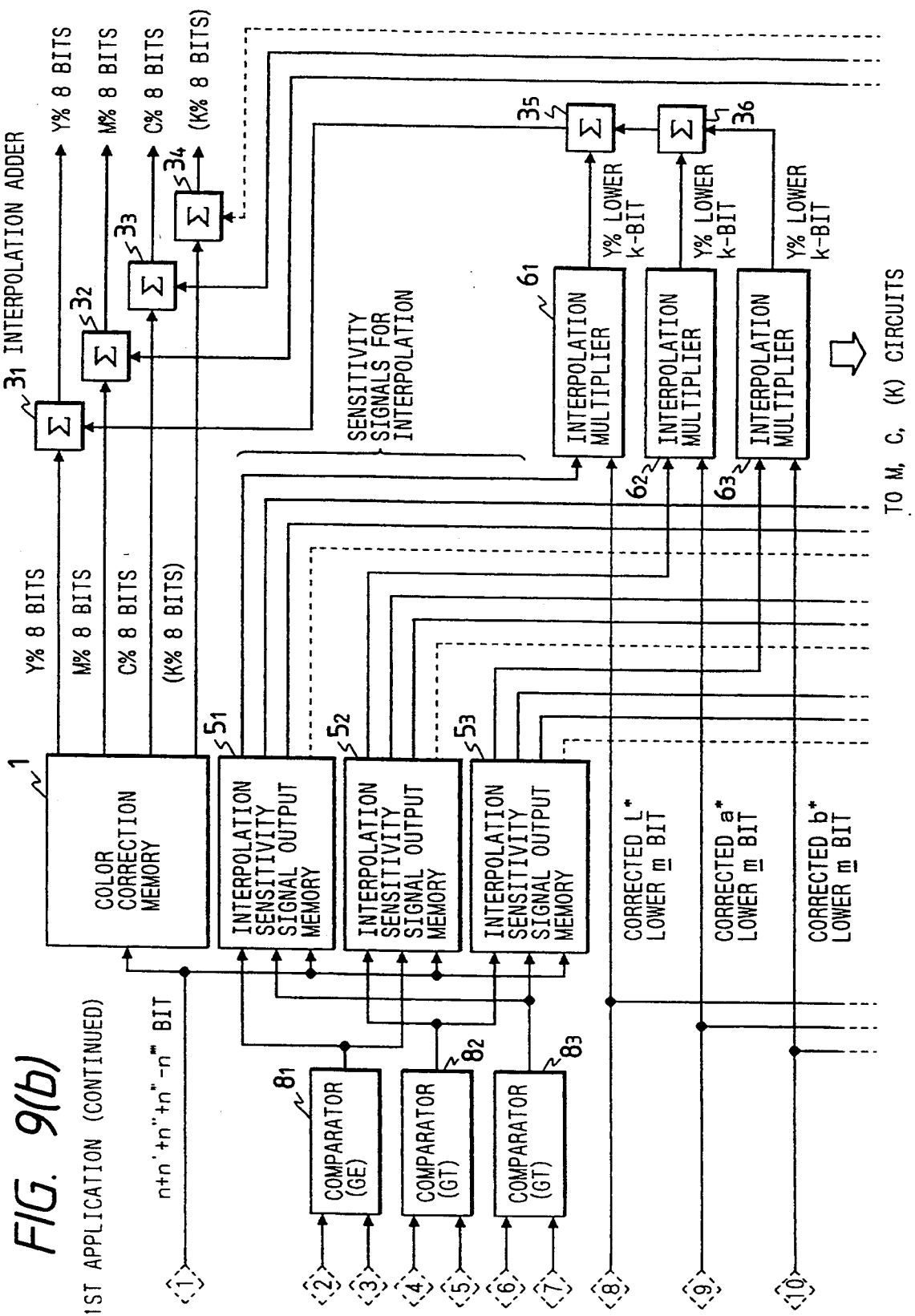
FIG. 9(b) 1ST APPLICATION (CONTINUED)

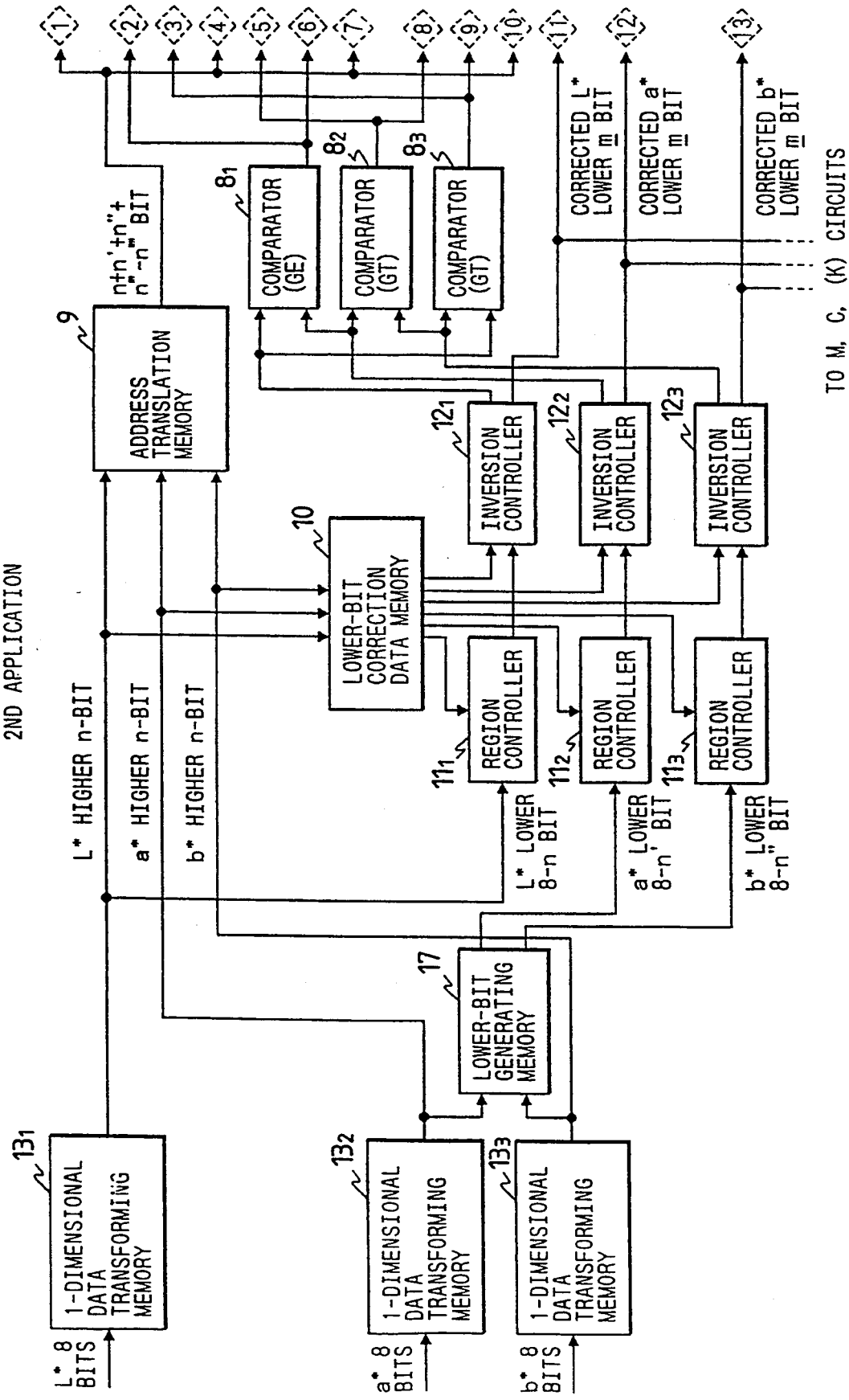
FIG. 10(a) 2ND APPLICATION

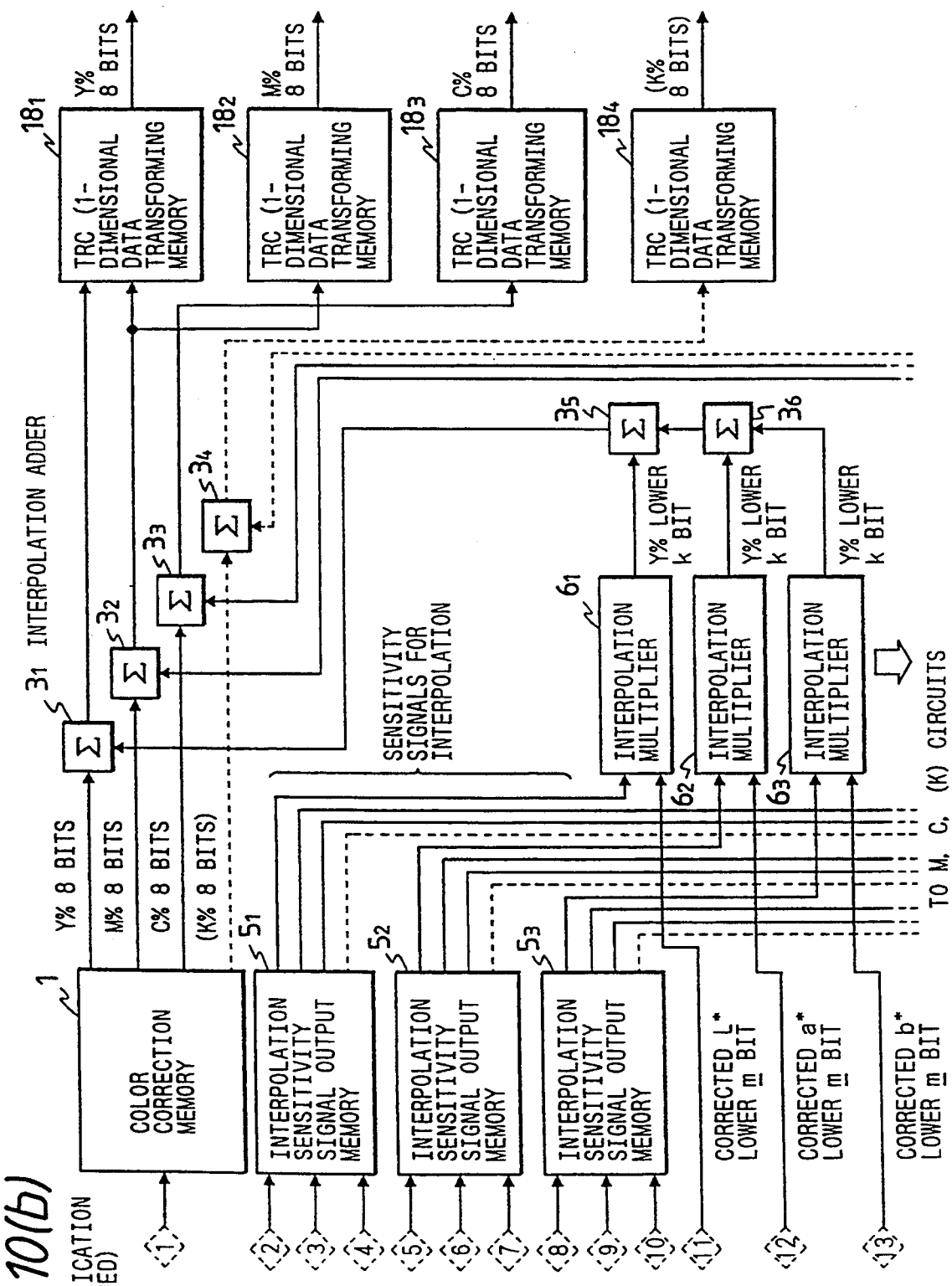
FIG. 10(b) 2ND APPLICATION (CONTINUED)

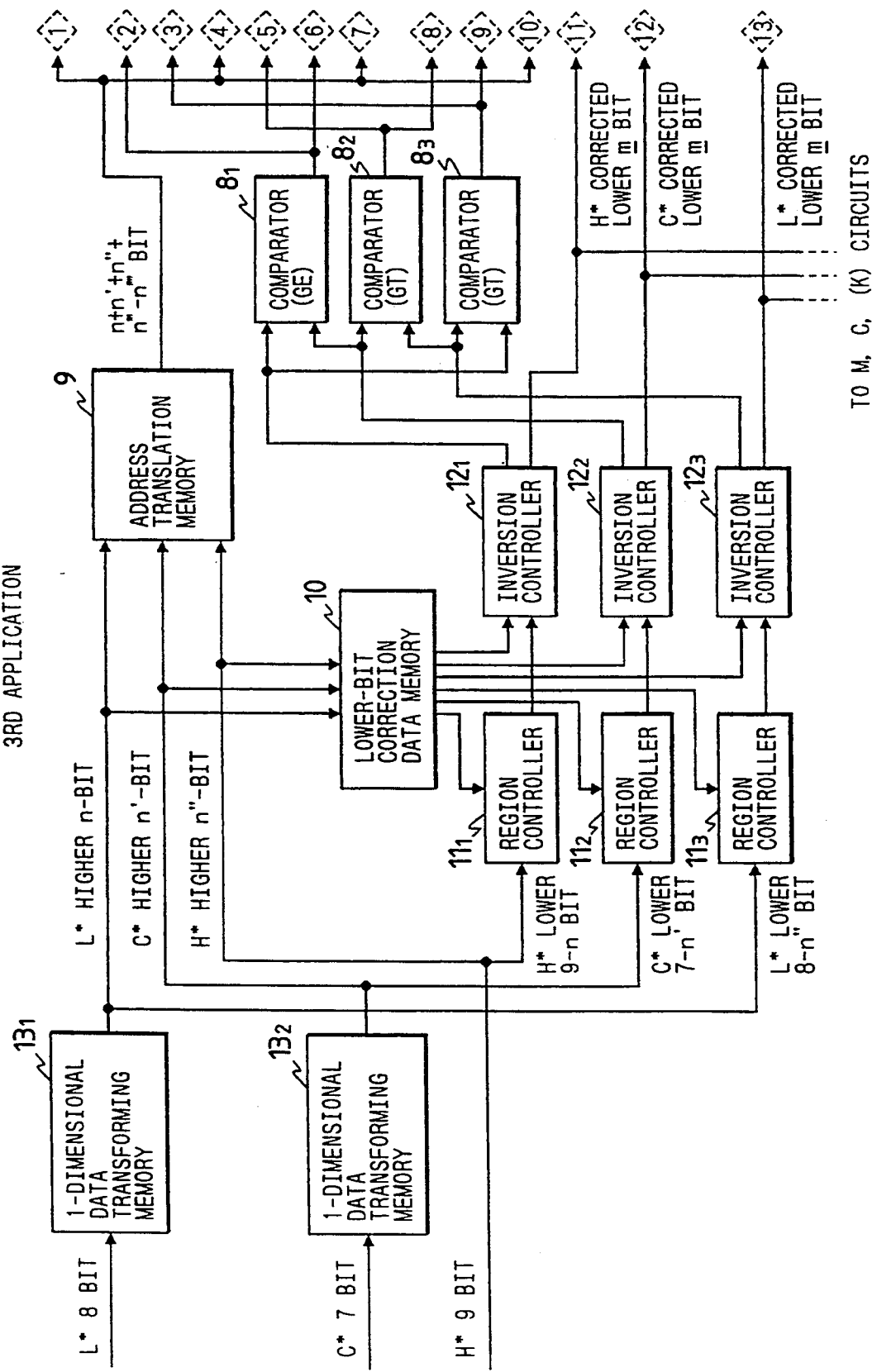

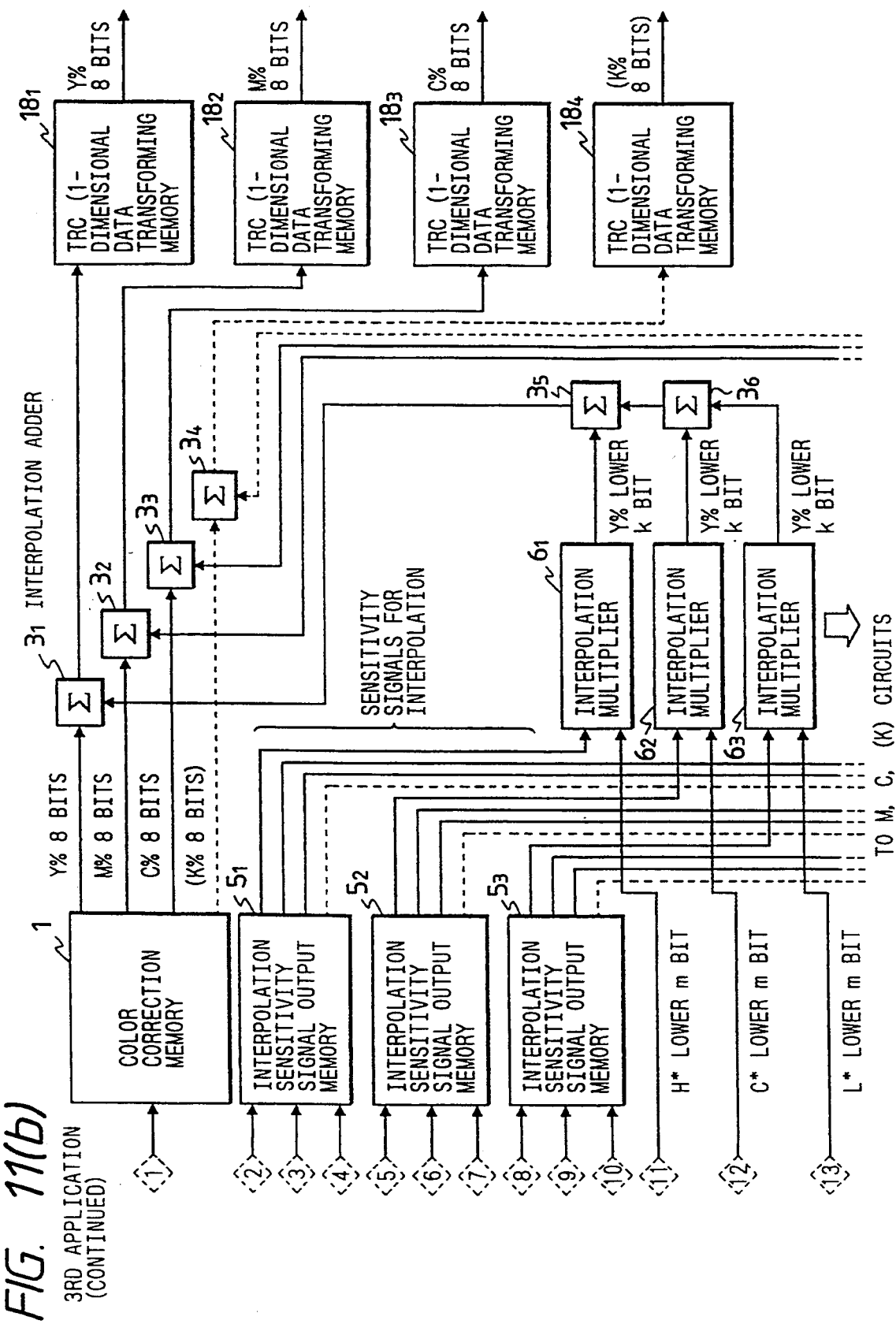

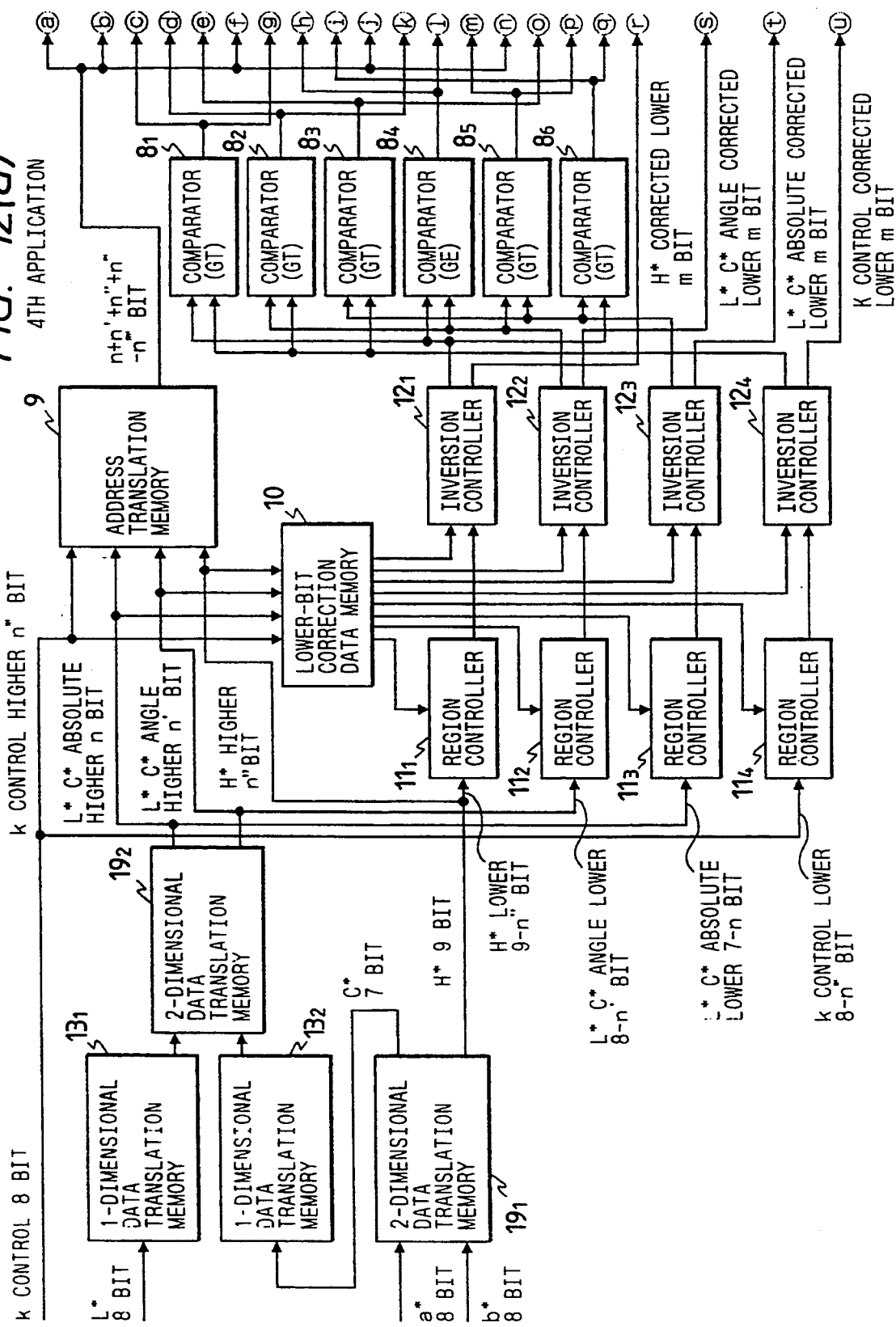
FIG. 12(a) 4TH APPLICATION

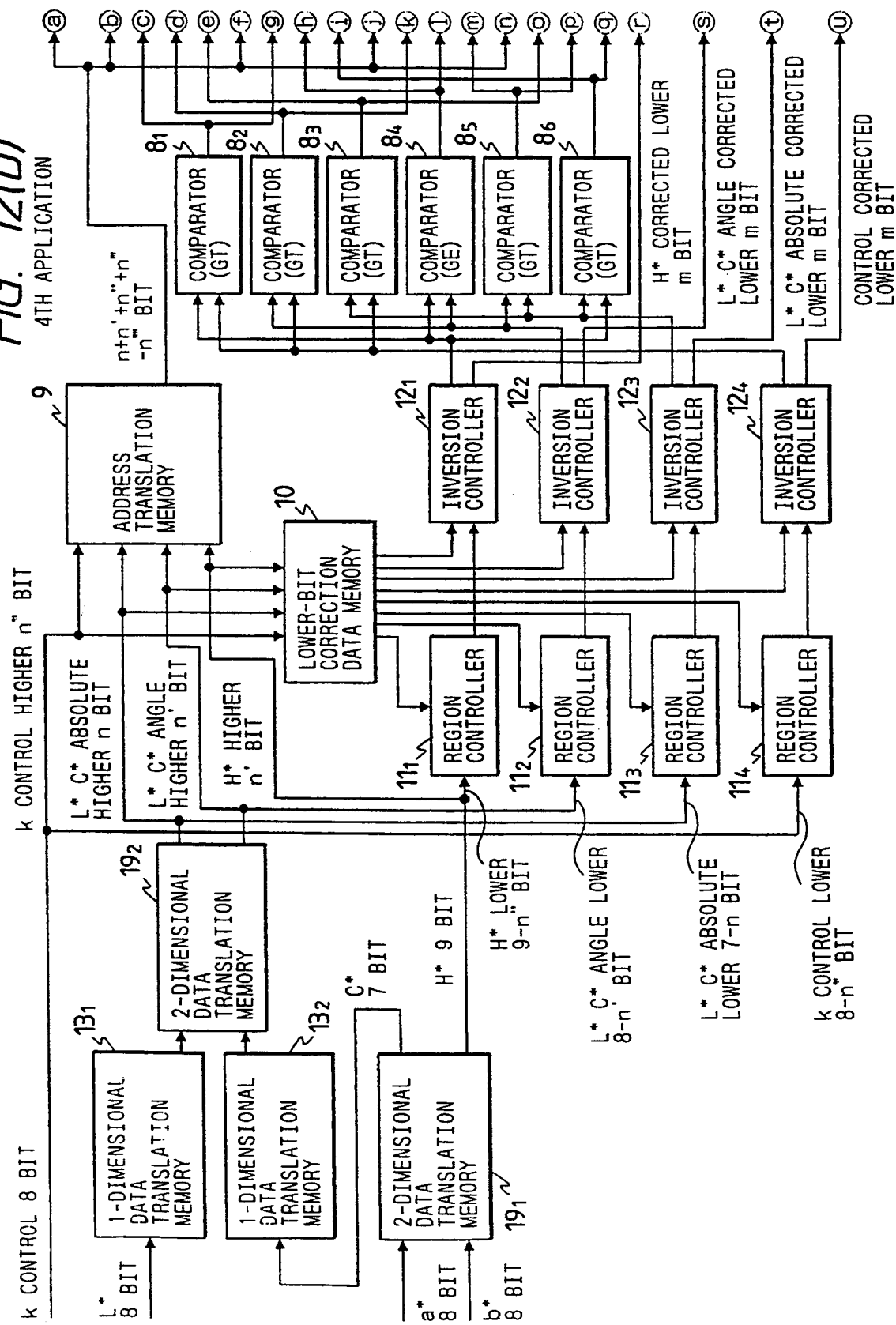
FIG. 12(b) 4TH APPLICATION

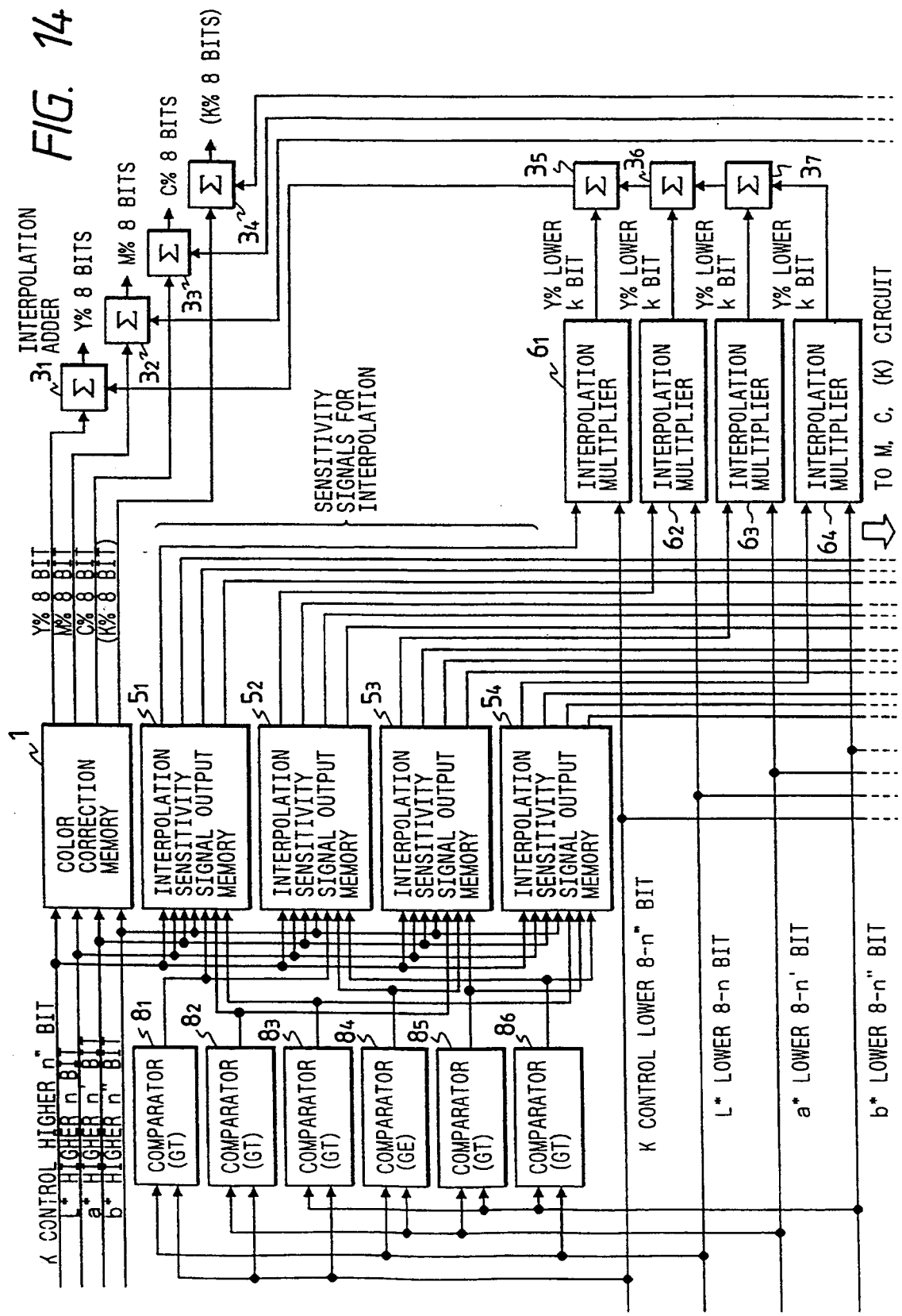

COLOR SIGNAL TRANSFORMING APPARATUS

This application is continuation-in-part of U.S. patent application Ser. Nos. 07/962,502 and 07/962,351, now U.S. Pat. No. 5,313,314, issued May 27, 1994, both filed Oct. 16, 1992 in the name of Hiroaki IKEGAMI.

BACKGROUND OF THE INVENTION

1. Field of the Invention

The present invention relates to a color signal transforming apparatus, such as a color printer or a color copying machine that transforms color signals to faithfully reproduce colors from an original document in a color image forming apparatus for outputting signals representative of full colors including half-tone.

2. Description of the Related Art

In the fields of color printing, color television, color copying machine, there are many proposals to transform color signals. In a typical example of those proposals, an input color space, e.g., a BGR color coordinate, is directly transformed into an output color space, e.g., a YMC (K) color coordinate by using a table memory. When three color signals are processed at resolutions of the necessary gray levels, a great amount of table data is required. To store the data, a table memory with a large memory capacity must be provided. Such a memory is very expensive.

For example, in a case where each of the input colors B, G, and R are expressed by 8 bits, and the output colors y, M, C, and K are also expressed by 8 bits, the required memory capacity of the table memory is $2^{24} \times 4$ bytes. It is impractical to use such a big memory.

Study for reducing the necessary memory capacity in transforming color signals by using the table memory has been made placing an emphasis mainly on the interpolation basis methods.

In these methods, a color correction memory addressed with the higher order bits of the input signals is used for reducing the necessary memory capacity. The coarsened data is corrected by using an interpolation circuit using the lower bits (Published Examined Japanese Patent Application No. Sho. 58-16180 and Published Unexamined Japanese Patent Application No. Hei. 2-187374 may be cited for the methods). Those disclosed techniques still have problems. For example, the interpolation calculations are complicated and consume much time. Further, the adjacent interpolation regions are discontinuous at the boundary.

The methods to solve the problems of the disclosed interpolation techniques have been proposed by the inventor(s) in other co-pending U.S. patent application Ser. Nos. 07/962,502 and 07/962,351 both filed on Oct. 16, 1992, the disclosures of which are incorporated herein by reference. The technical idea of the present patent application is directed to solve the problems of the prior techniques and to further improve the techniques of the above patent applications.

An example of the interpolation method for a 3-dimensional input signals disclosed in the above patent application Ser. No. 07/962,502 will be described with reference to FIG. 13 and using equation (1) below. An example of the interpolation method for a 4-dimensional input signals disclosed in the above patent application Ser. No. 962,351 will be described with reference to FIG. 14 and using an equation (2) below.

$$X'(x, y, z) = X'(x_h, y_h, z_h) + a_x(x_h, y_h, z_h, b_x(x_1, y_1, z_1)) x_1 + \\ a_y(x_h, y_h, z_h, b_y(x_1, y_1, z_1)) y_1 + a_z(x_h, y_h, z_h, b_z(x_1, y_1, z_1)) z_1 \quad (1)$$

$$X'(x, y, z, t) = X'(x_h, y_h, z_h, t_h) + \\ a_x(x_h, y_h, z_h, t_h, b_x(x_1, y_1, z_1, t_1)) x_1 + \\ a_y(x_h, y_h, z_h, t_h, b_y(x_1, y_1, z_1, t_1)) y_1 + \\ a_z(x_h, y_h, z_h, t_h, b_z(x_1, y_1, z_1, t_1)) z_1 + \\ a_t(x_h, y_h, z_h, t_h, b_t(x_1, y_1, z_1, t_1)) t_1 \quad (2)$$

where $X'(x, y, z)$ indicates a value of one output in the input $(x, y, z)$. $X'(x, y, z, t)$ indicates a value of one output in the input $(x, y, z, t)$. $x_h, y_h, z_h, t_h$ represent higher bits of an input. $x_1, y_1, z_1, t_1$ represent lower bits of the same. $X'(x_h, y_h, z_h)$ and $X'(x_h, y_h, z_h, t_h)$ represent each basic data obtained from the combination of the higher bits. $a_x(x_h, y_h, z_h, b_x((x_1, y_1, z_1))$, $a_y(x_h, y_h, z_h, b_y(x_1, y_1, z_1))$, $a_z(x_h, y_h, z_h, b_z(x_1, y_1, z_1))$, or $a_x(x_h, y_h, z_h, t_h, b_x((x_1, y_1, z_1, t_1))$, $a_y(x_h, y_h, z_h, t_h, b_y(x_1, y_1, z_1, t_1))$, $a_z(x_h, y_h, z_h, t_h, b_z(x_1, y_1, z_1, h_1))$, $a_t(x_h, y_h, z_h, t_h, b_t(x_1, y_1, z_1, t_1))$ represent sensitivity signals for interpolation. $b_x((x_1, y_1, z_1), b_y(x_1, y_1, z_1), b_z(x_1, y_1, z_1))$, or $b_x((x_1, y_1, z_1, t_1)), b_1(x_1, y_1, z_1, t_1), b_z(x_1, y_1, z_1, h_1), b_t(x_1, y_1, z_1, t_1)$ represent interpolation-region select signals obtained from the combinations of the lower bits.

The arrangements and operations of the color signal transforming apparatus of FIGS. 13 and 14 will be briefly described. Three or four input signals are each divided into higher bits and lower bits. The combinations of the higher bits are input as address signals to a color correction memory 1 for basic data. When receiving the higher bits, the color correction memory 1 outputs $X'(x_h, y_h, z_h)$ in the equation (1) or $X'(x_h, y_h, z_h, t_h)$ in the equation (2).

The combinations of lower bits of the input signals are input to a plural number of interpolation-region select means, which in turn output a plural number of interpolation-region select signals corresponding to $b_x(x_1, y_1, z_1), b_y(x_1, y_1, z_1) b_z(x_1, y_1, z_1)$ in the equation (1) or $b_x(x_1, y_1, z_1, t_1), b_y(x_1, y_1, z_1, t_1), b_z(x_1, y_1, z_1, t_1), b_t(x_1, y_1, z_1, t_1)$ in the equation (2).

The combinations of the higher bits of the input signals and some of the interpolation-region select signals are input to an interpolation sensitivity signal output memory 5 for interpolation. When receiving those signal, the memory 5 produces a plural number of sensitivity signals for interpolation, which represent $a_x(x_h, y_h, z_h, b_x((x_1, y_1, z_1)), a_y(x_h, y_h, z_h, b_y(x_1, y_1, z_1)), a_z(x_h, y_h, z_h, b_z(x_1, y_1, z_1))$ in the equation (1) or $a_x(x_h, y_h, z_h, t_h, b_x((x_1, y_1, z_1, t_1)), a_y(x_h, y_h, z_h, t_h, b_y(x_1, y_1, z_1, t_1)), a_z(x_h, y_h, z_h, t_h, b_z(x_1, y_1, z_1, h_1)), a_t(x_h, y_h, z_h, t_1, b_t(x_1, y_1, z_1, t_1))$ in the equation (2).

Each sensitivity output signal is multiplied by the corresponding one lower bit of the input signal by each interpolation multiplier 6 as shown. As the results of the multiplications, the multipliers output plural interpolation data.

Finally, adders add together the basic data and the plural interpolation data to produce interpolated values corresponding to $X'(x, y, z)$ in the equation (1) or $X'(x, y, z, t)$ in the equation (2).

The technique has the following features.

(1) There is no need of the complicated address translation when data is read out of the memory. This implies that a high speed processing is possible with a simple circuit construction.

(2) The regular arrangement in the color correction memory is not essential. The technique is compatible with the above-mentioned techniques, which each remove the memory portion corresponding to the gamut by arranging irregularly the data that are regularly arranged in the memory, disclosed in Published Unexamined Japanese Patent Application Nos. Hei. 2-73779 and 2-187374.

(3) A continuity at the boundary region between the adjacent interpolation regions is secured.

It is required to further reduce the memory capacity required in transforming color signals. The above-mentioned techniques, which is for reducing the memory capacity required in transforming color signals, may be further improved in reducing the required memory capacity in the following points.

(1) The technique, which removes the memory portion out of the color reproduction range of the output by arranging irregular the data that are regularly arranged in the memory, disclosed in Published Unexamined Japanese Patent Application No. Hei. 2-187374, needs some 2-dimensional memories. Accordingly, there is room for further improvement of the memory capacity in this technique.

(2) In the techniques disclosed in the above patent application Ser. Nos. 07/962,502 and 07/962,351, the color space is uniformly divided into segmental color spaces. The whole color space is not always equally processed, but the regions having similar color transforming characteristics may be roughly divided.

SUMMARY OF THE INVENTION

Accordingly, the present invention has an object to provide a color signal transforming apparatus, in specific forms, which can further reduce the memory capacity required in transforming color signals while conserving the features of the techniques disclosed in the above-mentioned patent applications.

To achieve the above object, there is provided a color signal transforming apparatus in which a plural number of input signals are each divided into higher bits and lower bits, and output signals are formed by calculating basic data obtained from the combinations of the higher bits and the combination of interpolation data obtained the combinations of the higher bits and the lower bits, the color signal transforming apparatus, as shown in FIG. 1, comprising: address translating memory means 101 for receiving the combination of higher bits as an address signal and translating the address signal to another address signal; color correction memory means 102 for basic data in response to the transformed address signal; lower-bit correcting means 105 for basic data including lower-bit correction data storing means 103 for outputting data for the lower-bit correction in response to an address signal as the combination of the higher bits, and lower-bit-correction calculating means 104 for correcting the lower bits by using the output signal from the lower-bit correction data storing means; interpolation data generating means 106 for generating a set of interpolation data on the basis of the transformed address signal output from the address translating means 101 and the combination of the corrected lower bits output from the lower-bit correcting means 105; and adder means 107 for adding together the output signal of the color correction memory means 102 and the output signal of the interpolation data generating means 106, thereby forming output signals.

A color signal transforming apparatus in which a plural number of input signals are each divided into higher bits and lower bits, and output signals are formed by calculating basic data obtained from the combinations of the higher bits and the combination of interpolation data obtained the combination of the higher bits and the lower bits, may be realized in several ways. The color signal transforming apparatus of the invention will be described in connection with the color signal transforming apparatuses, which are based on the technical ideas mathematically described by the above-mentioned equations (1) and (2).

The present invention may be mathematically described by the following equations (3) and (4).

$$X'(x, y, z) = X'(c(x_h, y_h, z_h)) + \qquad (3)$$
$$a_x(c(x_h, y_h, z_h), b_x(d(x_1, e_x(x_h, y_h, z_h)), d(y_1, e_y(x_h, y_h, z_h)),$$
$$d(z_1, e_y(x_h, y_h, z_h))))d(x_1, e_x(x_h, y_h, z_h)) + a_y(c(x_h, y_h, z_h),$$
$$b_y(d(x_1, e_x(x_h, y_h, z_h)), d(y_1, e_y(x_h, y_h, z_h)), d(z_1, e_z(x_h, y_h, z_h))))$$
$$d(y_1, e_y, x_h, y_h, z_h)) + a_z(c(x_h, y_h, z_h), b_z(d(x_1, e_x(x_h, y_h, z_h)),$$
$$d(y_1, e_y(x_h, y_h, z_h)), d(z_1, e_z(x_h, y_h, z_h)))) \, d(z_1, e_z(x_h, y_h, z_h))$$

$$X'(x, y, z, t) = X'(c(x_h, y_h, z_h, t_h)) + \qquad (4)$$
$$a_x(c(x_h, y_h, z_h, t_h), b_x(d(x_1, e_x(x_h, y_h, z_h, t_h)), d(y_1, e_y(x_h, y_h, z_h, t_h)),$$
$$d(z_1, e_z(x_h, y_h, z_h, t_h)), d(t_1, e_t(x_h, y_h, z_h, t_h))))$$
$$d(x_1, e_x(x_h, y_h, z_h, t_h)) + a_y(c(x_h, y_h, z_h, t_h),$$
$$b_y(d(x_1, e_x(x_h, y_h, z_h, t_h)), d(y_1, e_y(x_h, y_h, z_h, t_h)),$$
$$d(z_1, e_z(x_h, y_h, z_h, t_h)), d(t_1, e_t(x_h, y_h, z_h, t_h))))$$
$$d(y_1, e_y(x_h, y_h, z_h, t_h)) + a_z(c(x_h, y_h, z_h, t_h),$$
$$b_z(d(x_1, e_x(x_h, y_h, z_h, t_h)), d(y_1, e_y(x_h, y_h, z_h, t_h)),$$
$$d(z_1, e_z(x_h, y_h, z_h, t_h)), d(t_1, e_t(x_h, y_h, z_h, t_h))))$$
$$d(z_1, e_z(x_h, y_h, z_h, t_h)) + a_t(c(x_h, y_h, z_h, t_h),$$
$$b_t(d(x_1, e_x(x_h, y_h, z_h, t_h)), d(y_1, e_y(x_h, y_h, z_h, t_h)),$$
$$d(z_1, e_z(x_h, y_h, z_h, t_h)), d(t_1, e_t(x_h, y_h, z_h, t_h))))$$
$$d(t_1, e_t(x_h, y_h, z_h, t_h))$$

In the above equations, c ($x_h$, $y_h$, $z_h$) and c ($x_h$, $y_h$, $z_h$, $t_h$) are transformed address signals output from the address translating means 101 when it receives the combinations of the higher bits as address signals. $e_x(x_h, y_h, z_h)$, $e_y(x_h, y_h, z_h)$, $e_z(x_h, y_h, z_h)$, $e_x(x_h, y_h, z_h, t_h)$, $e_y(x_h, y_h, z_h, t_h)$, $e_z(x_h, y_h, z_h, t_h)$, $e_t(x_h, y_h, z_h, t_h)$ $t_h$) are the lower bits correcting signals output from the correcting-data storing means 103. d ($x_1$, $e_x(x_h, y_h, z_h)$), $d(y_1, e_y(x_h, y_h, z_h))$, $d(z_1, e_y(x_h, y_h, z_h))$, $d(x_1, e_x(x_h, y_h, z_h, t_h))$, $d(y_1, e_y(x_h, y_h, z_h, t_h))$, $d(z_1, e_z(x_h, y_h, z_h, t_h))$, $d(t_1, e_t(x_h, y_h, z_h, t_h))$ are signals of the corrected lower bits output from the lower-bit-correction calculating means 104.

In a specific mode of the address translating means, when the address translating means receives an address signal corresponding to interpolation regions ((1), (1)', (2), and (2)' in FIG. 2) outside a closed solid consisting of planes around a color reproduction range of the output device or a closed hypersolid consisting of hyperplanes around the same, the address translating means converges the transformed address output values on the surface of the closed solid or the closed hypersolid.

In another specific mode, the address translating means performs an address translation so that the output address signals corresponding to the received higher address signals of the adjacent interpolation regions to be integrated have qual output address values. The lower-bit correcting means performs a region processing for correcting the lower bits according to the integration of the interpolation regions.

For the region integration, the lower-bit correction data storing means stores lower-bit correction data for correcting the lower bits on the coordinate axis along which the regions are integrated and absolute-value correction data for correcting absolute values of on the lower bits of the remaining axes, which the absolute values are required as the result of the region integration. When an integrated region in the coordinates of color space is addressed, the lower-bit correction calculating means includes region control means (FIG. 5) for correcting the lower bits on the basis of the lower-bit correction data output from the lower-bit correction data storing means and the absolute value correction data.

The region control means, in a specific mode, includes a wired OR circuit (designated by reference numeral 20 in FIG. 5), which receives the lower bits and adds the lower-bit correction data to the received lower bits, and a shift register or a multiplier circuit (designated by reference numeral 21 or 22 in FIG. 5) for calculating the data output from the wired OR circuit and the absolute-value correction data.

The lower-bit-correction calculating means, in a specific mode, stores inversion-correcting data to instruct the inversion of the coordinate axis for correcting the lower bits when the transformed address values are converged on the surface of the closed solid or closed hyper solid. The lower-bit-correction calculating means includes inversion control means (FIG. 6) for controlling the inversion of the coordinate axis on the basis of the inversion correction data.

In the present invention, a plural number (e.g., 3 or 4) of input signals are each divided into higher bits and lower bits. The combination of the higher bits $x_h$, $y_h$, and $z_h$ or $x_h$, $y_h$, $z_h$, or $t_h$ is input as an address signal to the address translating means, which then outputs a transformed address signal corresponding to c ($x_h$, $y_h$, $z_h$) in the equation (3) or c ($x_h$, $y_h$, $z_h$, $t_h$) in the equation (4).

The address translation will be described with reference to FIG. 2.

In the illustration of FIG. 2, two-dimensional input signals are used for ease of explanation. The description of the address translation to follow may be correspondingly applied for three- or four-dimensional input signals.

The address translation is made for the purposes of reducing the nun%her of interpolation regions, thereby to reduce the memory capacity of a memory in an interpolation circuit, which is located subsequent thereto. The reduction of the number of interpolation regions is performed in the following two ways.

(1) To remove the interpolation regions outside the color reproduction range or to reduce the number of interpolation regions by interpolating those regions at the interpolation level, which is comparable with that of the interpolation regions around the boundary defining the color reproduction range.

(2) To reduce the number of interpolation regions by integrating the adjacent interpolation regions having similar color transforming characteristics.

The region reducing method (1) above includes two cases: one where input signals out of the color reproduction range of the output do not come in, and the other where the same signals come in.

In the first case where the input signals out of the color reproduction range do not come in, the interpolation regions (1), (1)', (2), and (2)' in FIG. 2 may be removed. Accordingly, the output signals corresponding to the higher bits of those regions are all assigned to an output address 0. Accordingly, the output address size is reduced by the number of the output signals.

In the second case where the input signals out of the color reproduction range of the output come in, the interpolation regions (1) and (1)' in FIG. 2 are interpolated at the same interpolation level as that for the interpolation regions (2) and (2)', bold dotted lines with arrow heads coupling the those regions. The output signals corresponding to the higher bits input signals of those regions are assigned to the output addresses of the corresponding interpolation regions (2) and (2)'. Accordingly, the output address size is reduced by the number of the interpolation regions (1) and (1)'.

The difference between the regions (1) and (1)' and the regions (2) and (2)' appears only in the X-axis direction when the input signals corresponding to the regions outside the color reproduction range do not come in. In this case, the output signals corresponding to the higher bits input signals of the interpolation regions (1) and (2) are all assigned to the output address 0. The output signals corresponding to the higher bits input signals of the interpolation region (1)' are assigned to the output addresses of the interpolation regions (2) coupled with the related regions with the dotted lines having arrow heads. Accordingly, the output address size is reduced by the number of the regions (1), (1)', and (2).

Those relationships, presented by way of example, are based on a case where the color compression is first carried out in the X-axis direction and then in the Y-axis direction. Here, the important processings are those of interpolation regions (2) and (2)' and divided interpolation regions (2)'' and (3)''.

Those processings secure a continuity of color at the boundary of the regions when the input signals outside the color reproduction range come in.

Specifically, by utilizing the partial division of the interpolation region described in the co-pending U.S. patent application Ser. Nos. 07/962,351 and 07/962502, the inputs corresponding the regions outside the color reproduction range are smoothly transformed on or at the lines and points containing the color reproduction range indicated by a broken line in FIG. 2.

Incidentally, the line/point including the color reproduction range illustrated is that in the two dimensional case. In the 3-dimensional case, a plane is further included, and in the 4-dimensional case, a hyperplane is further included. Accordingly, in the case under discussion, the color outside the color reproduction range is not placed completely within the color reproduction range, but is placed close to the boundary of the color reproduction range. In most cases, this state of color suffices for the practical use. To place the color completely within the color reproduction range, a one-dimensional data transforming memory, called a tone reproduction curve (TRC) contained memory, placed usually subsequent to the color transforming apparatus, is used.

This instance employs the region division by a line inclined at 45° downward to the right, not upward to the right. Accordingly, the processing corresponding to the inversion of the Y-axis is required. The inversion processing may be divided into two processings.

(a) The reference point for interpolation is shifted from the coordinates ($X_1$, $Y_1$) to ($X_1$, $Y_2$). To determine the color correction coefficient of the interpolation region, the reference output for the higher bits input ($X_1$, $Y_1$) is set to be equal to the reference output corresponding to the higher bit input ($X_1-1$, $Y_2-1$).

The reason why the reference output is for the ($X_1-1$, $Y_2-1$), not ($X_1$, $Y_1$), is that the number of bits of the signals applied to the multiplier for interpolation is prevented from being increased. This will be described later with reference to FIG. 3.

(b) The lower bits are inverted.

The inversion processing of (a) above is executed in the processing to determine the color correction coefficients, which is not related to the invention. The inversion processing of (b) above is executed by lower-bits correction data storing means and the lower-bit-correction calculating means, both being described later. The details of this processing will be described with reference to FIG. 3, for example.

In the region in which the line/point containing the color reproduction range requires the inclination of an angle larger than 45° C., the similar thing is possible if a region integration to be given below is used.

The reduced amount of memory capacity of the memory relating to the regions outside the color reproduction range of the output can be considered as a ratio of a volume of a color reproduction range and that of a hexahedron circumscribing the color reproduction range. It is known that in the case of L*, a*, and b* input signals, the required memory capacity can be reduced to $\frac{1}{4}$ (Published Unexamined Japanese Patent Application No. Hei. 2-73779).

An increase of the memory capacity resulting from the additional use of an address translation memory accessed with the combination of the higher bits of each input, is negligible when the number of higher bits is small. This memory reduction method is superior to the method of reducing the memory capacity of the memory relating to the regions outside the color reproduction range, proposed by Published Unexamined Japanese Patent Application No. Hei. 2-187374.

An example of the method of integrating the adjacent interpolation region in (2) above is illustrated in (3)′ in FIG. 2. In the example illustrated, two regions are integrated in the Y-axis direction. Any number of the interpolation regions of this type can be integrated in any input axis.

For the integration, the following three processings are carried out.

(a) The output address of the higher bits input of the regions to be integrated is assigned to the output address for the higher bits input of the integrated region.

In the case of (3)′ in FIG. 2, since the reference point for interpolating the integrated region is $(X_0, Y_0)$, the integrated region is $X_0 <= X < X_1$, $Y_1 < Y < Y_2$. The output address of the higher bits input $(X_0, Y_1)$ is set to be equal to the output address of the higher bits input $(X_0, Y_0)$.

(b) The color correction coefficient of the interpolation regions adjacent to the integrated region is determined taking a continuity of the interpolation region to the integrated region into account.

In the case of (3)′ in FIG. 2, the regions $X_1 <= X < X_2$, $Y_1 <= Y < Y_2$, $X_1 <= X < X_2$, and $Y_0 <= Y < Y_1$ are the interpolated regions. More specifically, the output corresponding to the input $(X_1, Y_1)$ is set to be an average value of the output corresponding to the input $(X_1, Y_0)$ and the output corresponding to the input $(X_1, Y_2)$. This results from the linear interpolation in each interpolation region. The interpolated region is also adjacent to the region $X_0 <= X < X_1$ and $Y_2 = < Y < Y_3$. A continuity of the boundary between them can be secured without any special processing since $(X_0, Y_2)$ and $(X_1, Y_2)$ defined the integrated region.

(c) The lower bits of the integrated region are corrected so as to be fit for the interpolation method.

The processing of (a) above is performed by the address translating means. The processing of (b) above is performed when the processing to determine the color correction coefficient, not related to the invention, is performed.

The processing of (c) above is executed by lower-bits correcting-data storing means and lower-bit-correction calculating means, both being described later. The details of the execution will be described using FIG. 3, for example, subsequently.

The effects of the regions integration cannot absolutely be concluded, because the effects depends on the input and output characteristics. This will clearly be understood when the effects of the regions integration in the polar coordinates are taken into consideration.

When in the polar coordinates inputs, each input axis is uniformly divided, the interpolation regions in the vicinity of the origin of the coordinates are small. The region becomes larger as the distance from the origin becomes longer. Accordingly, in the color transformation, the transforming accuracies of the regions are not uniform.

However, the uniformity of the transforming accuracies can be secured by using the instant region-integration method in a manner that the number of the regions to be integrated is gradually reduced with increase of the distance from the origin so that the divided regions are uniform in size.

The combination of higher bits $x_h, y_h, z_h$ or $x_h, y_h, z_h, t_h$ is applied as an address signal to the correcting-data storing means 103. Then, the correcting-data storing means outputs the lower-bits corrected data corresponding to $e_x(x_h, y_h, z_h)$, $e_y(x_h, y_h, z_h)$, $e_z(x_h, y_h, z_h)$, or $e_x(x_h, y_h, z_h, t_h)$, $e_y(x_h, y_h, z_h, t_h)$, $e_z(x_h, y_h, z_h, t_h)$, $e_t(x_h, y_h, z_h, t_h)$ in the equation (3) or (4).

The lower-bits corrected data and the lower bits of each input signal $x_1, y_1,$ and $z_1$ or $x_1, y_1, z_1, t_1$ is input to the lower-bit-correction calculating means 104, which in turn outputs the signal of $d(x_1, e_x(x_h, y_h, z_h))$, $d(y_1, e_y(x_h, y_h, z_h))$, $d(z_1, e_y(x_h, y_h, z_h))$, $d(x_1, e_x(x_h, y_h, z_h, t_h))$, $d(y_1, e_y(x_h, y_h, z_h, t_h))$, $d(z_1, e_z(x_h, y_h, z_h, t_h))$, $d(t_1, e_t(x_h, y_h, z_h, t_h))$ in the equation (3) or (4).

The correction of lower bits will be described with reference to FIGS. 3, 5 and 6.

The correction of lower bits is carried out by the following two processings:

(1) Region processing to adjust the size of the lower bits according to the integration of the regions, if the integration is made, and (2) Inversion processing as the result of axis inversion. In the correction illustrated in FIG. 3, three-dimensional inputs are used, two regions in the X-axis direction are integrated, and the axis is inverted to the Y-axis and Z-axis. For the region processing, two corrections are required; one on the integrated axis and the other on the axes not integrated. In the case of FIG. 3, two regions are integrated along the X-axis or in the X-axis direction. The correction on the integrated axis is to add 0 to the lower bits of the region $X_h < X < X_{h+1}$ at the place of (lower bits of the input + 1 bit), and to add 1 to the lower bits of the region $X_{h+1} < X < X_{h+2}$ at the place of (lower bits of the input + 1 bit). For the addition, the wired OR circuit (designated by numeral 20 in FIGS. 5(a) and 5(b)) may be used.

No integration of regions is carried out in the Y- and Z-axes. In the correction on the axes free from the region integration, the lower bits of the Y- and Z-axes inputs are doubled by a multiplier (shift register 21 in FIG. 5). This is done for setting the bit order of those axes to that of the X-axis.

Since the bit orders of the X-, Y- and Z-axes are exactly arranged with one another, a circuit (designated by reference numeral 8 in FIG. 4) for determining to which of partial regions {1} to {6} shown in FIG. 3 the region belongs may be the circuit used in the case of no regions-integration, although the number of bits of the circuit is increased.

As a matter of course, the sensitivity signal for interpolation must also be correspondingly halved when the color correction coefficient is determined.

More than two regions may be integrated in some axis directions (for some actual circuits for integrating the regions, reference is made to FIG. 5).

In the case of integrating the regions of $2^n$, the actual circuit may be realized by using the combination of simple circuits, a wired OR circuit and a shift register (see FIG. 4). In the case of integrating other numbers of regions than $2^n$, such as 3, 5, 6, and 7, the shift register is substituted by a multiplier (FIG. 5(b)).

In the case of FIG. 3, the correction data at the (lower bits + 1) are 0 (region $X_h < X < X_{h+1}$) and 1 (region $X_{h+1} < X < X_{h+2}$) for the X-axis, and 0 (region $X_h < X < X_{h+1}$) and 0 (region $X_{h+1} < X < X_{h+2}$) for the Y- and Z-axes. The absolute-value correction data for the bit-order arrangement are 0 (region $X_h < X < X_{h+1}$) and 0 (region $X_{h+1} < X < X_{h+2}$) for the X-axis, and 1 (region $X_h < X < X_{h+1}$) and 1 (region $X_{h+1} < X < X_{h+2}$) for the Y- and Z-axes.

Also in the case of integrating more than two regions, for example, 3, 4, 5, 5, 7, 8, ... numbers of regions, the circuit of FIG. 5(b) can be used, although the number of bits of the correction data at the (lower bits + 1) and the absolute-value correction data is increased.

The inversion processing is to subtract the region processed signal from $2^{L+1}$ where L is the number of the lower bits after region processed.

Also in the inversion processing, for the integration of regions of $2^n$, the actual circuit may be realized by using the combination of simple circuits, an invertor and an incremento (see FIG. 6(a)). In the case of integrating other numbers of regions than $2^n$, such as 3, 5, 6, and 7, a constant adder is additionally used (see FIG. 6(b)).

In the case of FIG. 3, the inversion correction data is 0 (region $X_h < X < X_{h+1}$) and 0 (region $X_{h+1} < X < X_{h+2}$) for the X-axis, and 0 (region $X_h < X < X_{h+1}$) for the Y- and Z-axes. When the inversion correction data is 0, the inversion and increment processings are not executed. When the inversion correction data is 1, the inversion and increment processings are executed.

The inversion correction data, after passing through the incremento, goes to the partial region determining comparator of the interpolation data generating means. The data emanating from the invertor, not passing through the incremento, goes to the interpolation multiplier. The reason for this is that after passing through the incremento, the data is incremented by one. To avoid the increase of the bits of the data to be applied to the multiplier, the data is directly applied to the multiplier, not passing through the incremento.

Already described, this can be realized in a manner that with the shift of the reference point for interpolation, the reference output for the higher bits input ($x_h$, $y_h$, $z_h$) is set to be equal to the reference output for the higher bits input ($x_h$, $y_{h+1}-1$, $z_{h+1}-1$), not for the higher bits input ($x_h$, $y_{h+1}$, $z_{h+1}$).

If the inversion processing is executed for all of the axes, the partial division method operates as in the case of no inversion is made. Accordingly, the number of the required inversion processing circuits may be one smaller than dimension number of the inputs.

The subsequent operation is similar to that in the above-mentioned co-pending patent applications (Ser. Nos. 07/962,502 and 07/962,351). The transformed address is applied as an address to the color correction memory means 102 for the basic data, which in turn produces the corresponding basic data.

The combination of the corrected lower bits is input to the interpolation data generating means 106. In the interpolation data generating means 106, an interpolation region select signal is generated on the basis of the combination of the corrected lower bits, an interpolation sensitivity signal is generated on the basis of the generated select signal, and interpolation data is generated on the basis of the sensitivity signal and the corrected lower bits.

The adder means 107 adds together the basic data output from the color correction memory means 102 and the interpolation data output from the interpolation data generating means 106, and then outputs an interpolated value.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings:

FIG. 5 is a block diagrams showing region controllers, in which

FIG. 5(a) shows the region controller for integrating the interpolation regions of $2^n$ and FIG. 5(b) shows the region controller for integrating other numbers of interpolation regions than $2^n$;

FIG. 6 is a block diagrams showing inversion controllers, in which

FIG. 6(a) shows the inversion controller for integrating the interpolation regions of $2^n$ and FIG. 6 (b) shows the inversion controller for integrating other numbers of interpolation regions than $2^n$;

FIG. 9 is a block diagram showing the arrangement of a first modification of a color signal transforming apparatus of the invention;

FIG. 10a is a block diagram showing the arrangement of a second modification of a color signal transforming apparatus of the invention, the illustration showing the left half of the arrangement;

FIG. 10b is a block diagram showing the arrangement of a second modification of a color signal transforming apparatus of the invention, the illustration showing the right half of the arrangement;

FIG. 11a is a block diagram showing the arrangement of a third modification of a color signal transforming apparatus of the invention, the illustration showing the left half of the arrangement;

FIG. 11b is a block diagram showing the arrangement of a third modification of a color signal transforming apparatus of the invention, the illustration showing the right half of the arrangement;

FIG. 12a is a block diagram showing the arrangement of a fourth modification of a color signal transforming apparatus of the invention, the illustration showing the left half of the arrangement;

FIG. 12b is a block diagram showing the arrangement of a fourth modification of a color signal transforming apparatus of the invention, the illustration showing the right half of the arrangement;

FIG. 14 is a block diagram showing the arrangement of another conventional color signal transforming apparatus disclosed in another co-pending U.S. patent application Ser. No. 07/962,351.

DESCRIPTION OF THE PREFERRED EMBODIMENTS

The preferred embodiments of the present invention and modifications thereof will be described with reference to FIGS. 4, and 7 through 12. In those figures, the circuit arrangements for only one of the output signals are illustrated, for ease of explanation. It is evident to those skilled in the art that the circuit arrangements may readily be extended for a plural number of outputs.

In those figures, the components of the type which would possibly be used as con, non components when the circuit arrangements illustrated are extended to the arrangements for the plural outputs, are illustrated as the components commonly used. However, those components may be separated in conformity with plural outputs if the separation of them would provide more exact color transformation or is required for their hardware implementation.

The number of outputs is three for the 3-dimensional input, and four for the 4-dimensional input. If necessary, it may be increased or decreased.

In the illustrations, for ease of explanation, the input signals, K control signal, and L*, a*, and b* color signals are each expressed by 8 bits. The output signals of Y%, M% and C% (K%) are each expressed also by eight bits. If necessary, the number of input signals and the number of bits may also be increased or decreased.

Figure 4:
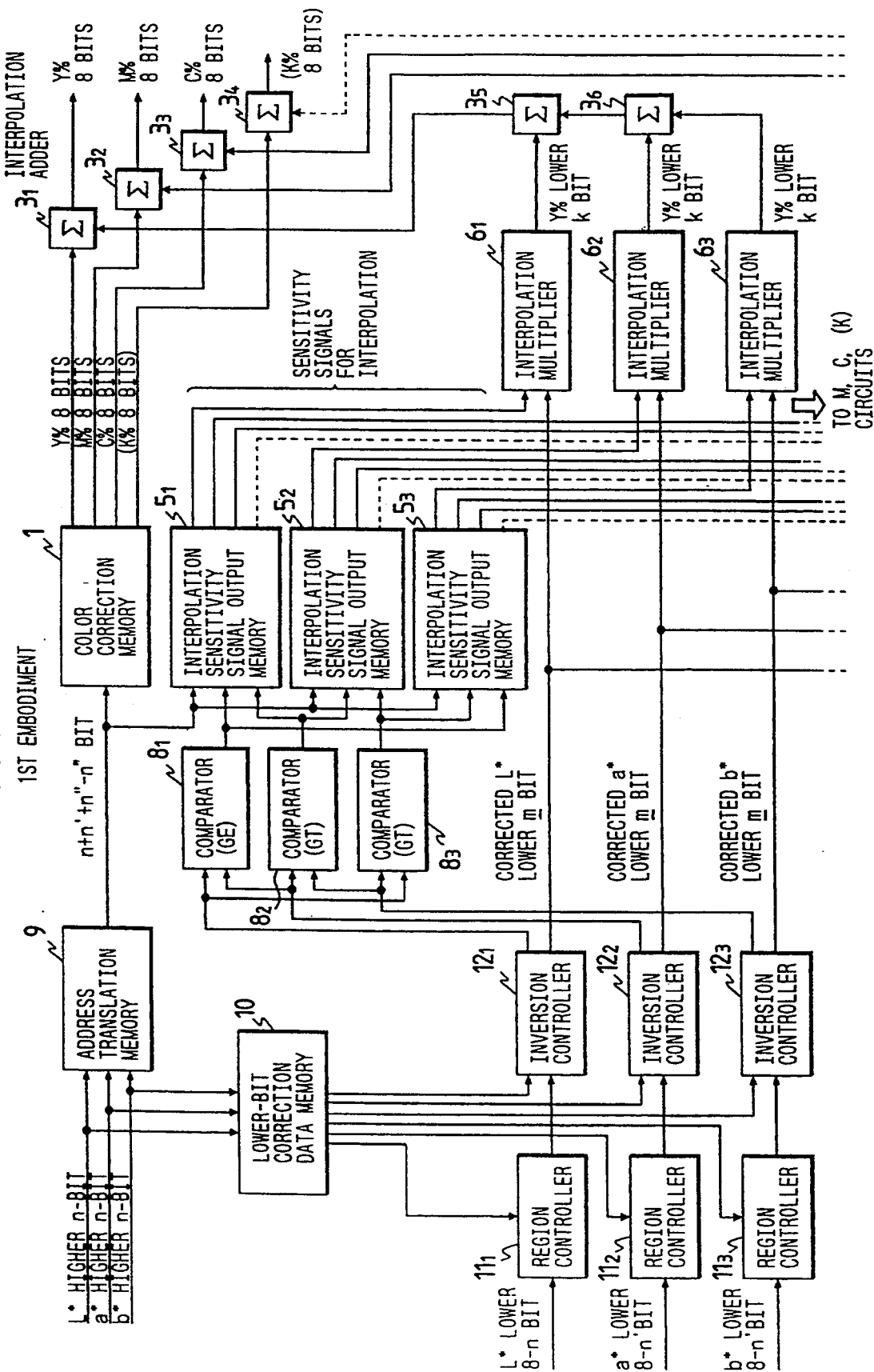
FIG. 4 is a block diagram showing the arrangement of a color signal transforming apparatus according to a first embodiment of the invention.

FIG. 4 is a block diagram showing a first embodiment of a color signal transforming apparatus according to the present invention.

Figure 13:
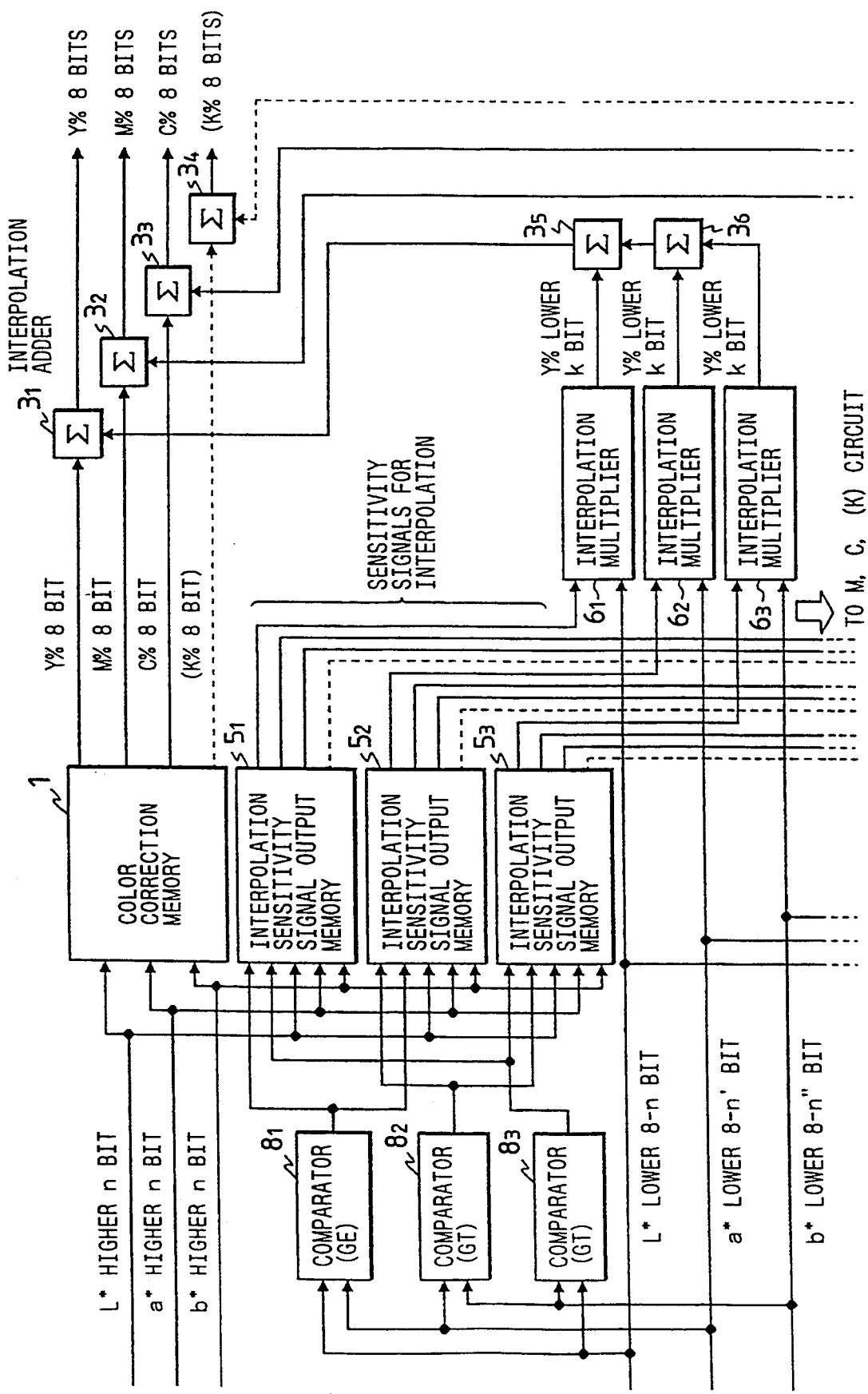
FIG. 13 is a block diagram showing the arrangement of a conventional color signal transforming apparatus disclosed in a co-pending U.S. patent application Ser. No. 07/962,502.

The apparatus of the first embodiment is constructed by applying the technical idea of the present invention to the color signal transforming apparatus of FIG. 13. As shown, the color signal transforming apparatus includes an address translation memory 9, a lower-bit correction data memory 10, region controllers 11, inversion controllers 12, a color correction memory 1 for basic data, comparators 8, interpolation sensitivity signal output memories 5, interpolation multipliers 6, and interpolation adders 3.

The address translation memory 9 is a lookup table memory, which receives an address signal consisting of the higher bits $x_h$, $y_h$, and $z_h$ of the input color signals L*, a*, and b*, and produces a transformed address c ($x_h$, $y_h$, $z_h$), read out of the table. The function of this memory has already been described hereinbefore.

The lower-bit correction data memory 10 is a lookup table memory, which receives an address signal consisting of the higher bits $x_h$, $y_h$, and $z_h$ of the input color signals L*, a*, and b*, and produces lower-bit correction data, $e_x(x_h, y_h, z_h)$, $e_y(x_h, y_h, z_h)$, and $e_z(x_h, y_h, z_h)$ in the equation (3) that is read out.

The region controllers 11 and the inversion controllers 12 make up lower-bit-correction calculating means, which receives the lower bits $x_1$, $y_1$, and $z_1$ of the input color signals L*, a*, and b* and the lower-bit correction data, $e_x(x_h, y_h, z_h)$, $e_y(x_h, y_h, z_h)$, and $e_z(x_h, y_h, z_h)$, and outputs the corrected lower-bit data d ($x_1$, $e_x(x_h, y_h, z_h)$), d ($y_1$, $e_y(x_h, y_h, z_h)$), and d ($z_1$, $e_z(x_h, y_h, z_h)$).

Figure 5:
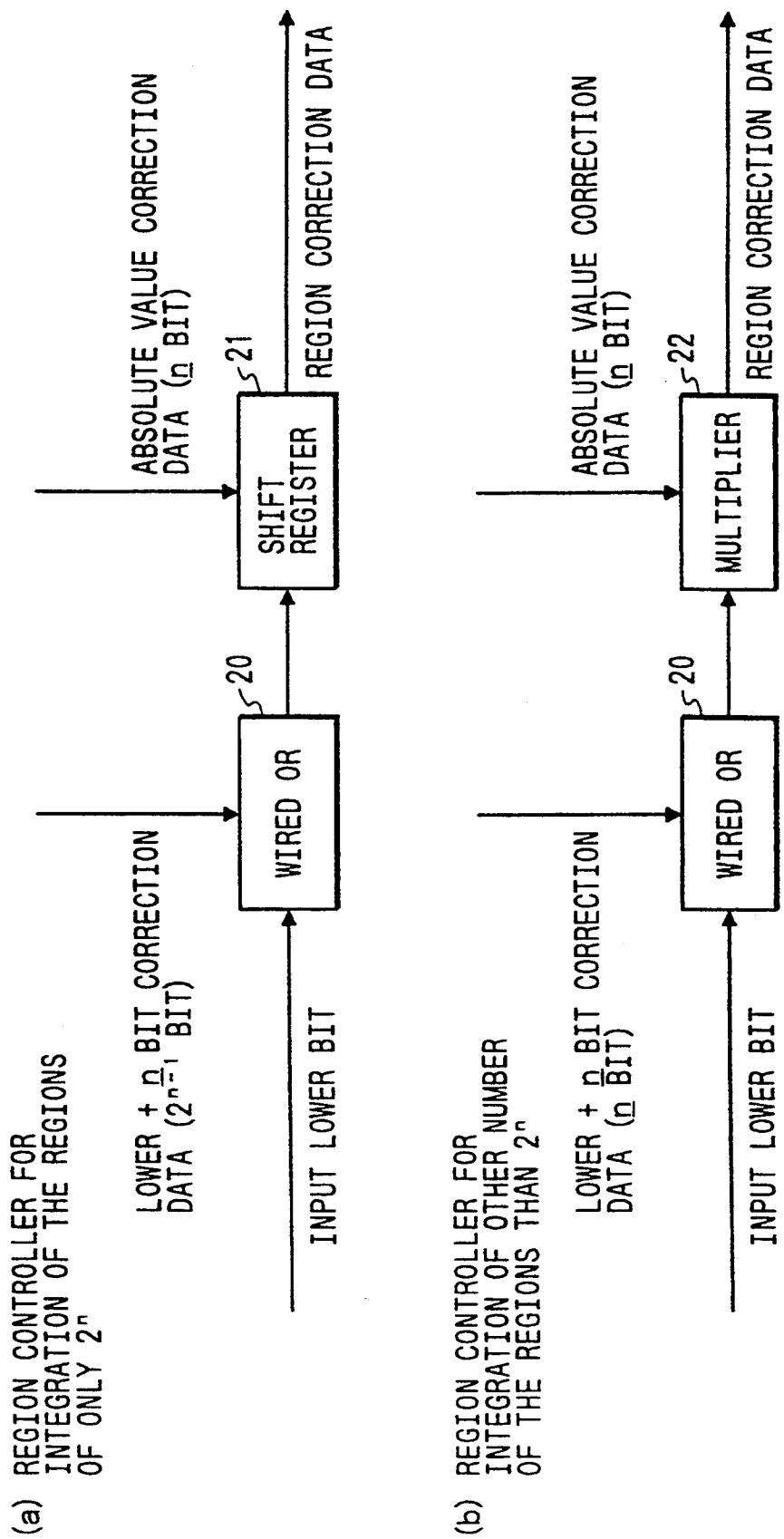

In FIG. 5 showing two example of the region controller, FIG. 5 (a) is a block diagram showing the region controller used when the regions are integrated every $2^n$ regions. FIG. 5(b) is a block diagram showing the region controller used when the region integration includes the integration of the number of the regions other than $2^n$.

Figure 1:
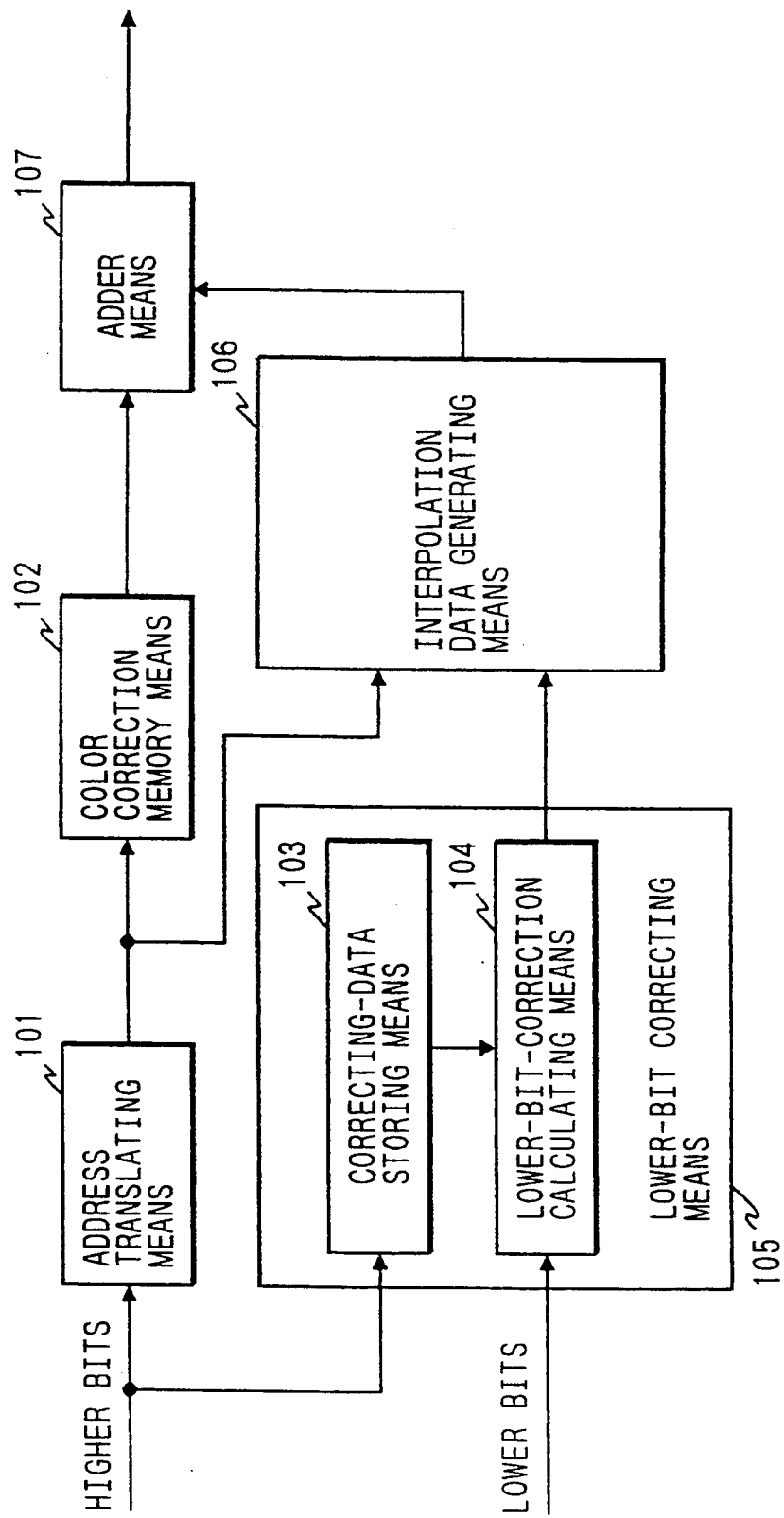
FIG. 1 is a block diagram showing the technical idea of the present invention.
Figure 2:
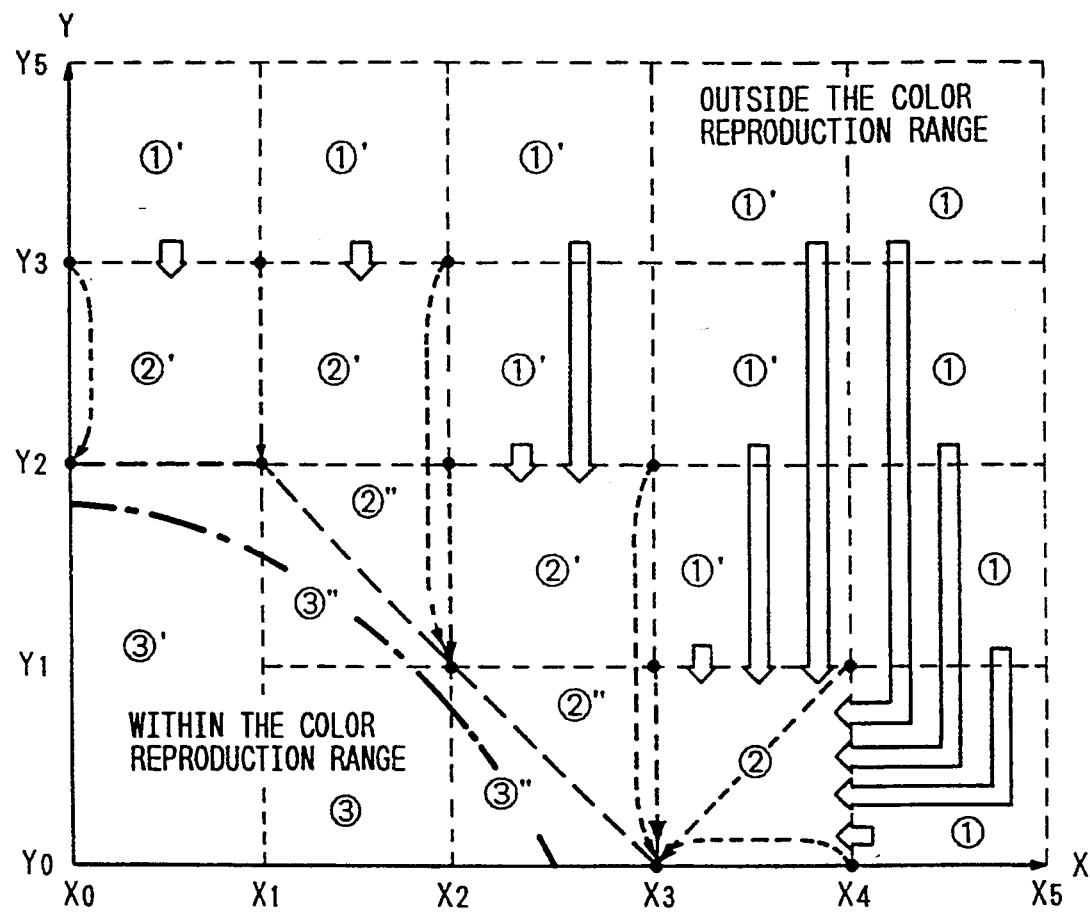
FIG. 2 is an explanatory diagram for use in explaining the processing of the regions outside the color reproduction range according to the invention, and the integration of the adjacent interpolation regions.
Figure 3:
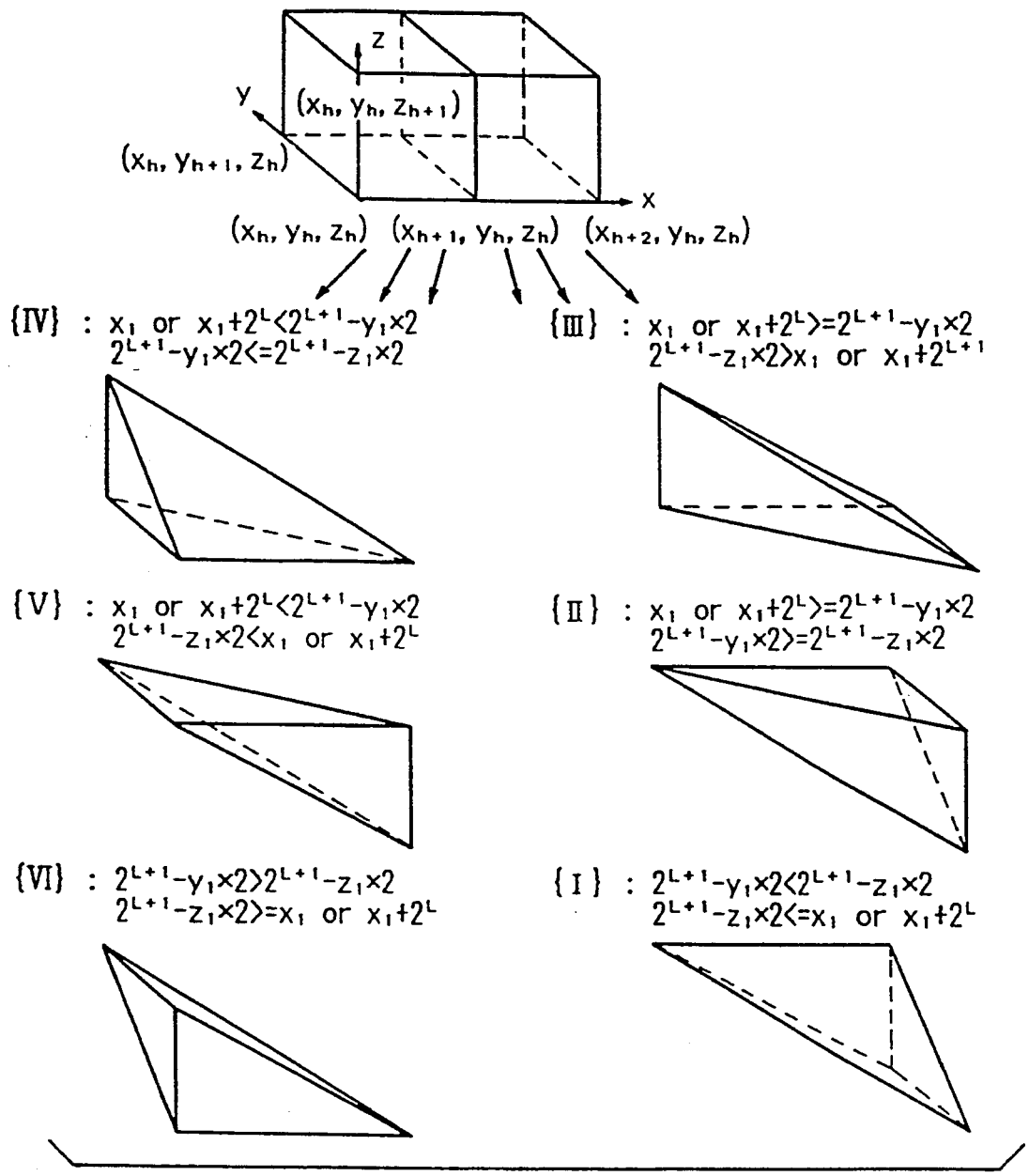
FIG. 3 is an explanatory diagram showing the integration of the adjacent interpolation regions and the processing of input axis inversion.

The region controller of FIG. 5(a) includes a wired OR circuit 20 for correcting the lower bits on the axis along which the regions are integrated, and a shift register 21 for multiplying the corrected lower bits by $2^n$ by shifting, by n bits, the lower bits on the nonintegration axis by absolute value correction data n in order to match the bit order of the . bits on the axis along which the regions are integrated (referred to as an integration axis) with the bit order of the bits on the axis along which the regions are not integrated (referred to as a nonintegration axis). In the case of FIG. 3, two regions are integrated along the X-axis or in the X-axis direction. The correction on the integration axis is to add 0 to the lower bits of the region $x_h < X < X_{h+1}$ at the place of (lower bits of the input+1 bit), and to add 1 to the lower bits of the region $x_{h+1} X < X_{h+2}$ at the place of (lower bits of the input+1 bit). In other words, the lower bits of the input are shifted by one digit toward the higher order, and the increased one digit is set to 0 in the $x_h < X < X_{h+1}$, and set to 1 in the region $X_{h+1} < X < X_{h+2}$.

The region controller of FIG. 5(b) uses a multiplier 22 for the absolute-value correction calculation since the region integration includes the integration of the number of the regions other than $2^n$.

In FIG. 6 showing inversion controllers 12, FIG. 6(a) is a block diagram showing the inversion controller used when the regions are integrated every $2^n$ regions. FIG. 6(b) is a block diagram showing the inversion controller used when the region integration includes the integration of the number of the regions other than $2^n$.

The inversion processing is to subtract the region-processed signal from $2^{L+1}$ where L is the number of the lower bits after region processed.

The region controller shown in FIG. 5(a) includes an invertor 23 for performing the inversion processing by subtracting the region-processed signal from $2^{L+1}$, and an incremento 24 for performing the calculation of +1.

In the case of FIG. 3, the inversion correction data is 0 (region $x_h < X < X_{h+1}$) and 0 (region $x_{h+1} < X$-

$<X_{h+2}$) for the X-axis, and 0 (region $x_h<X<X_{h+1}$) for the Y- and Z-axes. When the inversion correction data is 0, the inversion and increment processings are not executed. When the inversion correction data is 1, the inversion and increment processings are executed.

The inversion correction data, after passing through the incrementor, goes to the partial region determining comparator of the interpolation data generating means. The data emanating from the invertor, not passing through the incremento, goes to the interpolation multiplier. The reason for this is that after passing through the incrementor, the data is incremented by one. To avoid the increase of the bits of the data to be applied to the multiplier, the data is directly applied to the multiplier, not passing through the incrementor.

Already described, this can be realized in a manner that with the shift of the reference point for interpolation, the reference output for the higher bits input ($x_h$, $y_h$, $z_h$) is set to be equal to the reference output for the higher bits input ($x_h$, $y_{h+1}-1$, $z_{h+1}-1$), not for the higher bits input ($x_h$, $y_{h+1}$, $z_{h+1}$).

The inversion controller of FIG. 6(b) is equivalent to the FIG. 6(a) circuit additionally using a constant adder 25. The adder is used because the inversion controller handles the region integration of integrating more than two regions, for example, 3, 4, 5, 5, 7, 8, ... numbers of regions.

As already described, the inversion controllers 12 are not required for all of the input signals, the L*, a*, and b* color signals. The inversion controller for one of the input signals may be omitted.

In the color signal transforming apparatus, the remaining portion of the circuit arrangement includes the color correction memory 1, comparators $8_1$ to $8_3$, interpolation sensitivity signal output memories $5_1$ to $5_3$, interpolation multipliers $6_1$ to $6_3$, and interpolation adders $3_1$ to $3_6$, and its operation are substantially the same as those disclosed in the co-pending U.S. patent application Ser. No. 07/962,502 which is already referred to, except that the transformed address signals, in place of the upper bits of the L*, a*, and b* signals, are applied to the interpolation sensitivity signal output memories $5_1$ to $5_3$, and the corrected lower bits of the L*, a*, and b*, in place of the lower bits of them, are applied to the comparators and the interpolation multipliers. The remaining circuit arrangement will be described using the equation (3), which corresponds to the equation (1) and FIG. 13, although it may be realized in several ways.

The address signals, transformed by the address translation memory 9, are applied, as address signals, to the color correction memory 1 for basic data, which in turn produce basic data corresponding to X' (c ($x_h$, $y_h$, $z_h$)) in the equation (3).

The combination of the corrected lower bits is input to the comparators $8_1$ to $8_3$ for interpolation region selection, which produce a plural number of interpolation region select signals corresponding to $b_x(d(x_1, e_x(x_h, y_h, z_h)), d(y_1, e_y(x_h, y_h, z_h)), d(z_1, e_y(x_h, y_h, z_h)))$, $b_y(d(x_1, e_x(x_h, y_h, z_h)), d(y_1, e_y(x_h, y_h, z_h)), d(z_1, e_z(x_h, y_h, z_h)))$, $b_z(d(x_h, e_x(x_h, y_h, z_h)), d(y_1, e_y(x_h, y_h, z_h)), d(z_1, e_z(x_h, y_h, z_h)))$ in the equation (3).

The transformed address of the upper bits of the input signals and some of the interpolation region select signals are input to the interpolation sensitivity signal output memories $5_1$ to $5_3$, which in turn output a plural number of interpolation sensitivity signals corresponding to $a_x(c(x_h, y_h, z_h), b_x(d(x_1, e_x(x_h, y_h, z_h)), d(y_1, e_y(x_h, y_h, z_h)), d(z_1, e_y(x_h, y_h, z_h)))$, $a_y(c(x_h, y_h, z_h), b_y(d(x_1,$ $e_x(x_h, y_h, z_h)), d(y_1, e_y(x_h, y_h, z_h)), d(z_1, e_z(x_h, y_h, z_h)))$, $a_z(c(x_h, y_h, z_h), b_z(d(x_1, e_x, (x_h, y_h, z_h)), d(y_1, e_y(x_h, y_h, z_h)), d(z_1, e_z(x_h, y_h, z_h))))$ in the equation (3).

In the interpolation multipliers $6_1$ to $6_3$, the interpolation sensitivity output signals are respectively multiplied by the corrected lower bits of the input signals L*, a*, and b*, and plural interpolation data are output. Finally, in the interpolation adders $3_1$ to $3_6$, the basic data and the plural interpolation data are added together, and the result is output in the form of an interpolated value represented by X' (x, y, z) in the equation (3).

As described in the co-pending U.S. patent application Ser. No. 07/962,502, the set of comparators may be substituted by interpolation region select memory means; the interpolation sensitivity signal output memory, by interpolation sensitivity signal output means; and the interpolation sensitivity signal output memory and the interpolation multipliers, by interpolation sensitivity select output memory means or interpolation sensitivity select output means and interpolation data output memory means, or plural interpolation data output memory means.

In order to determine to which of the divided interpolation regions the region to be interpolated belongs, the interpolation region select memory means receives the combination of the lower bits as an address signal and outputs a plural number of interpolation region select signals, which are fit for the commonness of the interpolation sensitivity signals. The interpolation sensitivity output means includes an interpolation difference-signal output memory for outputting difference data corresponding to the remaining lattice points when one of the lattice points of each of the regions to be interpolated is a reference point, a plurality of subtractors for calculating the difference between the difference data to output interpolation sensitivity signals, and a plural number of selectors for selecting interpolation a sensitivity output signal of the corresponding interpolate$^d$ region from among the plural number of interpolation sensitivity output signals by using interpolation region select signals. The interpolation sensitivity select output memory means receives, as address signals, the combination of the higher bits of the input signals and some of the interpolation region select signals, and outputs select signals for selecting sensitivities of plural interpolations. The interpolation data output memory means a memory portion which receives the combination of the higher bits of the input signals as address signals and outputs difference data corresponding to the remaining lattice points when one of the lattice points of each of the regions to be interpolated is a reference point, a plural number of subtractors for calculating the difference between the difference data, a portion for selecting output signals of sensitivities of a proper number of interpolations from among the difference data or the subtraction results by using some of the interpolation region select signals, and a portion for converting the selected interpolation sensitivity output signals into select output signals of the sensitivities of a plural number of interpolations.

Figure 7:
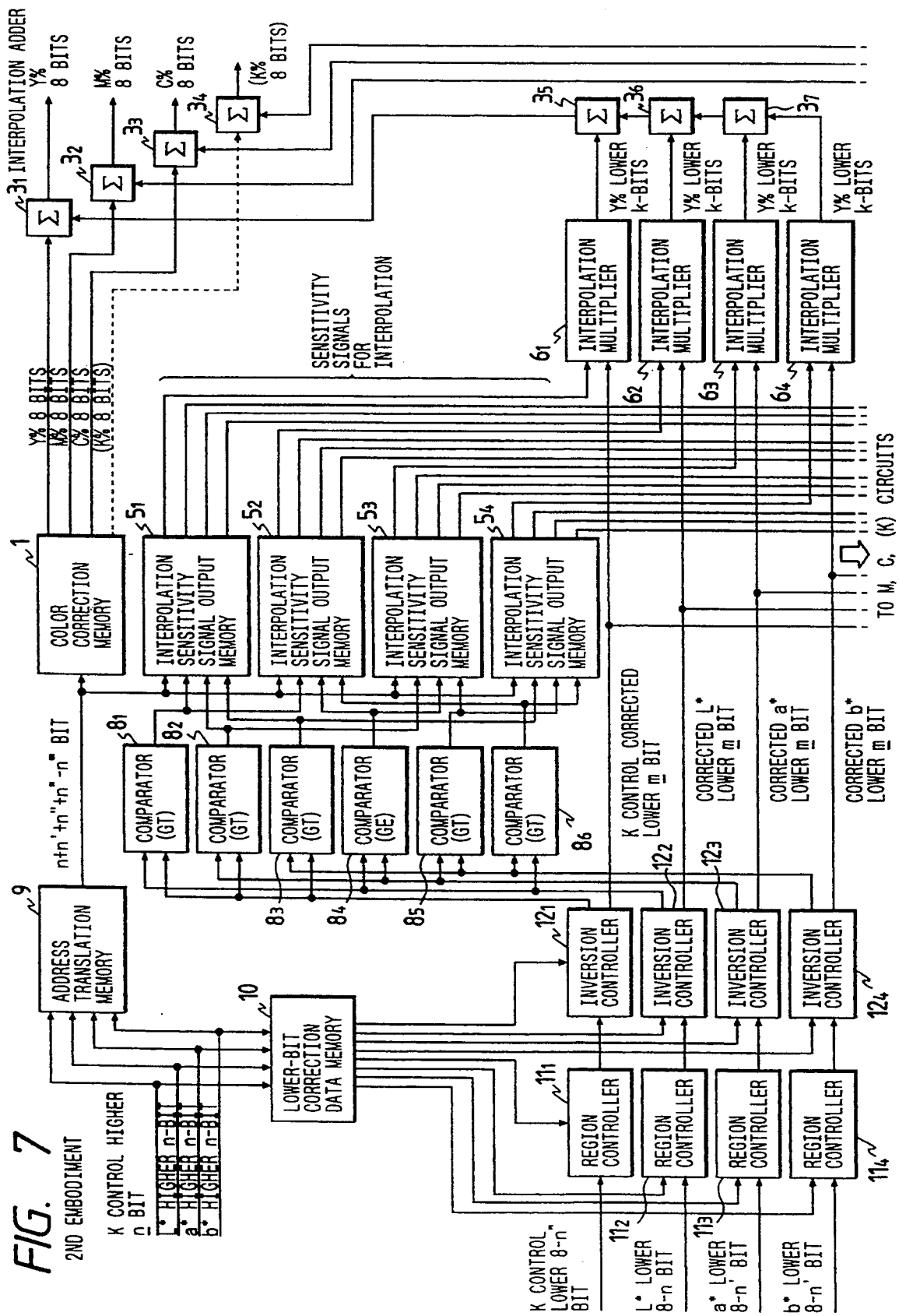
FIG. 7 is a block diagram showing the arrangement of a color signal transforming apparatus according to a second embodiment of the invention.

FIG. 7 is a block diagram showing the second embodiment of a color signal transforming apparatus.

The color signal transforming apparatus of the second embodiment is based on the combination of the technical idea disclosed in the co-pending U.S. patent application Ser. No. 07/962,351 and the technical idea of the present invention. The color signal transforming apparatus of the second embodiment uses the same kinds of circuit components as in the apparatus of the first embodiment. Since the apparatus of the second embodiment handles 4-dimensional input signals, the number of circuit components used is correspondingly increased.

An address translation memory 9 is a lookup table memory, which receives an address signal consisting of the higher bits $x_h$, $y_h$, $z_h$, and $t_h$ of the K control signal and the input color signals L*, a*, and b*, and produces an translated address signal c ($x_h$, $y_h$, $z_h$, $t_h$) that is read out.

A lower-bit correction data memory 10 is a lookup table memory, which receives an address signal consisting of the higher bits $x_h$, $y_h$, $z_h$, and $t_h$ of the K control signal and the input color signals L*, a*, and b*, and produces the lower-bit correction data $e_x(x_h, y_h, z_h, t_h)$, $e_y(x_h, y_h, z_h, t_h)$, $e_z(x_h, y_h, z_h, t_h)$, and $e_t(x_h, y_h, z_h, t_h)$, that is read out.

Region controllers 11 and inversion controllers 12 make up a lower-bit-correction calculating circuit, which receives the lower bits $x_1$, $y_1$, $z_1$, and $t_1$ of the K control signal and the input color signals L*, a*, and b* and the lower-bit correction data, $e_x(x_h, y_h, z_h, t_1)$, $e_y(x_h, y_h, z_h, t_1)$, and $e_z(x_h, y_h, z_h, t_1)$, and outputs the corrected lower-bit data d ($x_1, e_x(x_h, y_h, z_h, t_h)$), d ($y_1, e_y(x_h, y_h, z_h, t_h)$), d ($z_1, e_z(x_h, y_h, z_h, t_h)$), and d ($t_1, e_t(x_h, y_h, z_h, t_h)$).

The region controllers 11 may employ the circuit constructions shown in FIG. 5, as in the first embodiment. The inversion controllers 12 may employ the circuit constructions shown in FIG. 6, as in the first embodiment.

As already described, the inversion controllers 12 are not required for all of the input signals, K control signal and L*, a*, and b* color signals. The inversion controller for one of the input signals may be omitted.

In the color signal transforming apparatus, the remaining portion of the circuit arrangement includes the color correction memory 1, comparators $8_1$ to $8_6$, interpolation sensitivity signal output memories $5_1$ to $5_4$, interpolation multipliers $6_1$ to $6_4$, and interpolation adders $3_1$ to $3_7$, and its operation are substantially the same as those disclosed in the co-pending U.S. patent application Ser. No. 07/962,351 already referred to, except that the transformed address signals, in place of the upper bits of the K control signal and the L*, a*, and b* color signals, are applied to the interpolation sensitivity signal output memories $5_1$ to $5_4$, comparators $8_1$ to $8_6$, and the corrected lower bits of the K control signal, the L*, a*, and b* color signals, in place of the lower bits of them, are applied to the comparators $8_1$ to $8_6$.

The address signal, transformed by the address translation memory 9, are applied to the color correction memory 1, which in turn produces basic data corresponding to X' (c ($x_h$, $y_h$, $z_h$, $t_h$)) in the equation (4).

The combination of the corrected lower bits is input to the interpolation-region select comparators $8_1$ to $8_6$, which produce a plural number of interpolation region select signals corresponding to $b_x$ (d($x_1$, $e_x$ ($x_h$, $y_h$, $z_h$, $t_h$)), d($y_1$, $e_y(x_h, y_h, z_h, t_h)$), d($z_1$, $e_z(x_h, y_h, z_h, t_h)$), d($t_1$, $e_t(x_h, y_h, z_h, t_h)$)), $b_y$(d($x_1$, $e_x(x_h, y_h, z_h, t_h)$), d($y_1$, $e_x$, ($x_h$, $y_h$, $z_h$, $t_h$)), d($z_1$, $e_z(x_h, y_h, z_h, t_h)$), d($t_1$, $e_t(x_h, y_h, z_h, t_h)$)), $b_z$(d($x_1$, $e_x(x_h, y_h, z_h, t_h)$), d($y_1$, $e_y(x_h, y_h, z_h, t_h)$), d($z_1$, $e_z(x_h, y_h, z_h, t_h)$), d($t_1$, $e_t(x_h, y_h, z_h, t_h)$)), $b_t$(d($x_1$, $e_x(x_h, y_h, z_h, t_h)$), d($y_1$, $e_y(x_h, y_h, z_h, t_h)$), d($z_1$, $e_z(x_h, y_h, z_h, t_h)$), d($t_1$, $e_t(x_h, y_h, z_h, t_h)$))) in the equation (4).

The transformed address of the upper bits of the input signals and some of the interpolation region select signals are input to the interpolation sensitivity signal output memories $5_1$ to $5_6$, which in turn output a plural number of interpolation sensitivity signals corresponding to $a_x$(c($x_h$, $y_h$, $z_h$, $t_h$), $b_x$(d($x_1$, $e_x(x_h, y_h, z_h, t_h)$), d($y_1$, $e_y(x_h, y_h, z_h, t_h)$), d($z_1$, $e_z(x_h, y_h, z_h, t_h)$), d($t_1$, $e_t(x_h, y_h, z_h, t_h)$))), $a_y$(c($x_h$, $y_h$, $z_h$, $t_h$), $b_y$(d($x_1$, $e_x(x_h, y_h, z_h, t_h)$), d($y_1$, $e_y$, ($x_h$, $y_h$, $z_h$, $t_h$)), d($z_1$, $e_z(x_h, y_h, z_h, t_h)$), d($t_1$, $e_t(x_h, y_h, z_h, t_h)$))), $a_z$(c($x_h$, $y_h$, $z_h$, $t_h$), $b_z$(d($x_1$, $e_x(x_h, y_h, z_h, t_h)$), d($y_1$, $e_y(x_h, y_h, z_h, t_h)$), d($z_1$, $e_z(x_h, y_h, z_h, t_h)$), d($t_1$, $e_t(x_h, y_h, z_h, t_h)$))), $a_t$(c($x_h$, $y_h$, $z_h$, $t_h$), $b_t$(d($x_1$, $e_x(x_h, y_h, z_h, t_h)$), d($y_1$, $e_y(x_h, y_h, z_h, t_h)$), d($z_1$, $e_z(x_h, y_h, z_h, t_h)$), d($t_1$, $e_t(x_h, y_h, t_h)$))) in the equation (4).

In the interpolation multipliers $6_1$ to $6_4$, the interpolation sensitivity output signals are respectively multiplied by the corrected lower bits of the input signals, and plural interpolation data are output. Finally, the basic data and the plural interpolation data are added together, and the results are output in the form of interpolated values represented by X' (x, y, z) and X' (x, y, z, t) in the equation (4).

As described in the co-pending U.S. patent application Ser. No. 07/962,351, the set of comparators may be substituted by interpolation region select memory means; the interpolation sensitivity signal output memory, by interpolation sensitivity signal output means; and the interpolation sensitivity signal output memory and the interpolation multipliers, by interpolation sensitivity select output memory means or interpolation sensitivity select output means and interpolation data output memory means.

Figure 8:
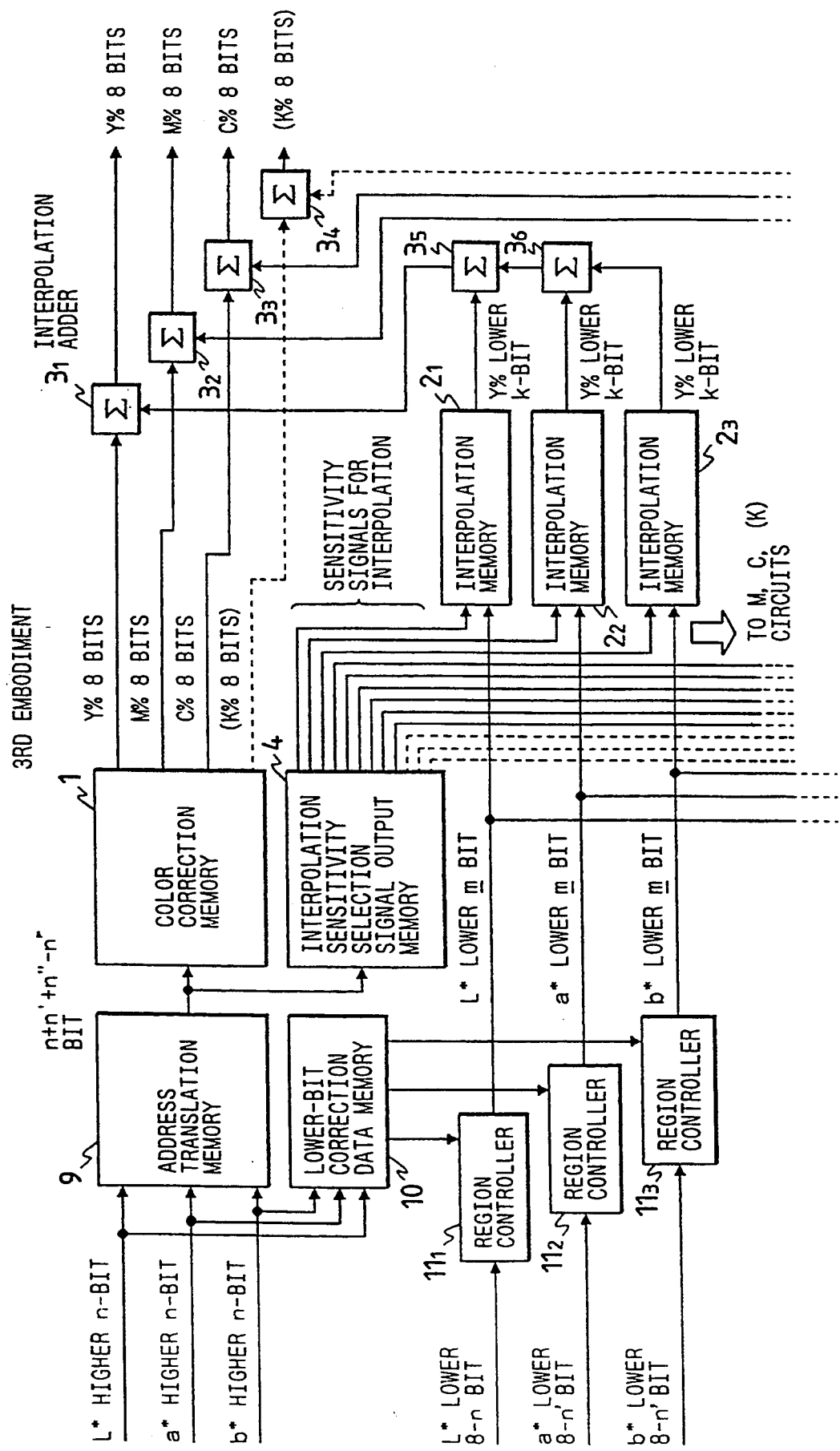
FIG. 8 is a block diagram showing the arrangement of a color signal transforming apparatus according to a third embodiment of the invention.

FIG. 8 is a block diagram showing the third embodiment of a color signal transforming apparatus.

The color signal transforming apparatus of the third embodiment is the combination of the technical idea of the present invention and one of the interpolating method described in Published Unexamined Japanese Patent Application No. Hei. 2-187374. As shown, the apparatus is made up of an address translation memory 9, a lower-bit correction data memory 10, region controllers 11, a color correction memory 1, an interpolation sensitivity select signal output memory 4, interpolation data memories 2, and interpolation adders 3.

In the interpolation method disclosed in Published Unexamined Japanese Patent Application No. Hei. 2-187374, when the input signals are expressed by the 3-dimensional orthogonal coordinates, the hexahedron per se is treated as a region to be interpolated. Accordingly, the partial division method, which is used in the co-pending U.S. patent applications Ser. Nos. 07/962,502 and 07/962,351 is not used. The region cannot be divided by the inclined line of 45° C. as shown in FIG. 3. Use of the inversion controllers is purposeless. For this reason, the inversion controllers are not used in the apparatus of the third embodiment.

In the instant apparatus, all of the input color signals must be within the color reproduction range of the output.

An address translation memory 9 is a lookup table memory, which receives an address signal consisting of the higher bits of the input color signals L*, a*, and b*, produces an transformed address signal.

A lower-bit correction data memory 10 is a lookup table memory, which receives the transformed address signal, and produces the lower-bit correction data.

Region controllers 11 make up a lower-bit-correction calculating circuit, which receives the lower bits of the input color signals L*, a*, and b* and the lower-bit correction data, and outputs the corrected lower-bit data.

The remaining portion of the circuit arrangement, which includes the color correction memory 1, interpolation sensitivity select signal output memory 4, interpolation data memories $2_1$ to $2_3$, and interpolation adders $3_1$ to $3_7$, and its operation are substantially the same as those disclosed in Published Unexamined Japanese Patent Application No. Hei. 2-187374 already referred to, except that the transformed address signals, in place of the upper bits of the L*, a*, and b* color signals, are applied to the color correction memory and the interpolation sensitivity select signal output memory, and the corrected lower bits of the L*, a*, and b* color signals, in place of the lower bits of them, are applied to the interpolation data memories.

When the present invention is simply applied to the orthogonal coordinates of L*, a*, and b* as in the abovementioned embodiments, the hue of the colors outside the color reproduction range changes in practical use.

This problem arises from the fact that the technical idea of the invention allows only the independent processing to be applied for each of the axes of the input color signals. To solve this problem, another circuit must be additionally used.

Several examples of the additional circuit will be described hereinafter in the form of modifications.

FIG. 9 is a block diagram showing the circuit arrangement of a first application of the invention.

The first modification is the combination of the first embodiment and the modified technique described in Published Unexamined Japanese Patent Application No. Hei. 2-187374. Accordingly, the circuit arrangement of the modification additionally uses one-dimensional data transforming memories $13_1$ to $13_3$, a maximum generator 14, a minimum generator 15, a maximum/minimum generating memory 16, and a lower-bit generating memory 17, and eliminates the inversion controllers.

One-dimensional data transforming memories 13 respectively receive the L*, a*, and b* color signals as input signals and produce one-dimensional transformed L*, a*, and b* color signals.

The general purposes of the data transformation are to change the scale of the input signals and to roughly process the input signals outside the color reproduction range of the output.

For the process to roughly process the input signals outside the color reproduction range of the output, two methods may be enumerated; a clipping method and a color compression method. In the clipping method, the colors within the color reproduction range are reproduced in one-to-one correspondence manner. The colors outside the color reproduction range, when reproduced, are put to the outermost side of the color reproduction range. In the color compression method, the colors outside the color reproduction range are smoothly compressed into the range of the color reproduction. With this, the colors within the color reproduction range are also compressed correspondingly.

Either way, the one-dimensional data transformation imperfectly provides the clipping and the color compression. To compensate for the imperfect clipping or color compression, some circuit is required following the circuit for roughly processing the input colors out of the color reproduction range.

Nevertheless, the one-dimensional data transforming memory is advantageous in that since the amount of data handled therein is smaller than that in the two- or three-dimensional memories, the data can readily be reprogrammable. With the advantage, the contents of the one-dimensional data transforming memory are reprogrammed according to the results of investigating a spatial distribution of the L*, a*, and b* colors or some data transformations previously prepared are selectively switched according to an external control signal.

The lower-bit generating memory 17 is a two-dimensional memory which receives the transformed a* and b* color signals and produces the lower bits of the a* and b* color signals. In cooperation with the address translation memory 9, the memory 17 performs the clipping operation, viz., it perfectly put the input colors out of the color reproduction range to the outermost side of the color reproduction range on the a*-b* plane, while keeping the hue satisfactory.

The maximum/minimum generating memory 16 is a two-dimensional memory which receives the transformed a* and b* color signals and produces maximum and minimum values of the L* for the a* and b* color signals. The minimum value as the output signal of the memory, together with the transformed L* signal, is input to the maximum generator 14 which in turn outputs the signal, which is the larger of the two signals input thereto.

Its output signal and the maximum value of the L* signal are input to the minimum generator 15, which in turn produces the signal which is the smaller of the two input signals.

The maximum generator 14, minimum generator 15, and maximum/minimum generating memory 16 cooperate to perform the clipping operation, viz., it perfectly put the input colors out of the color reproduction range to the outermost side of the color reproduction range in the L* axial direction.

In this way, the input color signals of L*, a*, and b* outside the color reproduction range are perfectly placed within the color reproduction range.

The subsequent circuit arrangement including the address translation memory 9, lower-bit correction data memory 10, region controllers $11_1$ to $11_3$, color correction memory 1 for basic data, comparators $8_1$ to $8_3$, interpolation sensitivity signal output memories $5_1$ to $5_3$, interpolation multipliers $6_1$ to $6_3$, and interpolation adders $3_1$ to $3_6$ functions as that of the first embodiment does, and hence no further description will be given. No inversion controller is required since the input, L*, a*, and b* color signals are completely within the color reproduction range.

The above application can also be realized by the combination of the modified technique with the second or third embodiment.

FIGS. 10(a) and 10(b) cooperate to show the arrangement of a second modification of the invention.

The arrangement of the second modification is such that the maximum generator 14, the minimum generator 15, and the maximum/minimum generating memory 16 are removed, and TRCs (one-dimensional transforming memories) 18 constructed as already described are additionally used. The difference of the second application from the first application resides in that the combination of the maximum generator, the minimum generator, and the maximum/minimum generating memory 16, which are for the clipping in the L* axis direction, are substituted by the combination of the address translation memory 9, the lower-bit correction data memory 10, and the region controllers 11, and the inversion controllers 12.

In the second application, the input colors are not confined within the color reproduction range of the output in the L* axial direction, but are transformed on the closest plane/line/point containing the color reproduction range. In the case of Y, M, C, and K% of the outputs, values slightly exceeding 100% and values of less than 0% are contained.

The TRCs 18 confine them within the range from 0% to 100%, thereby securing a complete clipping of the input colors within the color reproduction range of the output The increase of the memory capacity of the lower-bit correction data memory 10 is negligible when comparing with reduction of the memory capacity, which results from the omission of the maximum/minimum generating memory 16. In the case of 8 bits×2 inputs and 8 bits×2 outputs for the memory capacity of the maximum/minimum generating memory 16, approximately $2^{17}$ bytes can be saved when comparing with the first application.

With regard to the image quality, in the instant application, the final clipping uses the Y, M, C, and K%, so that the hue of the colors out of the color reproduction range can be kept inexact. Some selection of the upper bits would eliminate the defect.

As a matter of course, the instant application may be realized by the combination of the modified technique and the second embodiment.

FIGS. 11(a) and 11(b) cooperate to show the arrangement of a third modification of the invention.

The third modification is different from the second modification in that the lower-bit generating memory 17 is not used, and the input color signals are L*, H*, and C* color signals of the polar coordinates transforming type.

Except when colors are changed as desired, the scale change of the inputs and the roughly processing of the input colors out of the color reproduction range of the output are not required for the hue H*. Accordingly, the one-dimensional data transformation on the hue H* is omitted. The instant application performs the clipping on the a*-b* plane while keeping good hue by using the combination of the address translation memory 9, the lower-bit correction data memory 10, the region controllers 11, and the inversion controllers 12, not using the lower-bit generating memory. In this respect, the instant application is also different from the second application.

Since the input color signals are L*, H*, and C* color signals of the polar coordinates transforming type, the color signals outside the color reproduction range of the output can be transformed on the closest plane/line/point containing the color reproduction range, without changing the hue.

In the case of 8 bits×2 inputs and 4 bits×2 outputs for the memory capacity of the lower-bit generating memory 17, approximately $2^{16}$ bytes can be saved when comparing with the second application.

With regard to the image quality, the second and third applications are equivalent to each other in that the final clipping uses the Y, M, C, and K% color signals. Since the third application is based on the polar coordinates, the interpolation regions near the origin of the coordinates are small. This problem can be solved using the region integration technique. In this respect, both the applications are equivalent.

The instant application may be realized by the combination of the modified technique and the second embodiment.

FIGS. 12(a) and 12(b) cooperate to show the arrangement of a fourth modification of the invention.

The fourth modification is equivalent to the extension of the third application to the four-dimensional arrangement. Two-dimensional data transforming memories 19 are used. Further, the input color signals are L*, a*, and b* color signals of the orthogonal coordinates type, not L*, H*, and C* color signals.

The difference of the fourth modification from the first to third modifications resides in the clipping direction. In the previous applications, the clipping of the input colors is performed on the a*-b* plane while keeping good hue, and then is performed in the L* axial direction. On the other hand, in the fourth modification, the clipping progresses toward the center of the space defined by L*, a*, and b*.

The first two-dimensional data transforming memory $19_1$ is a two-dimensional memory which receives a* and b* color signals and outputs H* and C* color signals.

The second two-dimensional data transforming memory $19_2$ is a two-dimensional memory which receives L* and C* color signals and outputs an angle between H* and C* and the absolute values of them. This transforming memory transforms the orthogonal coordinates to the polar coordinates of which the origin is at L*=50 and C*=0, for example, on the L*-C* plane. If required, the clipping may be carried out on the L*-C* plane. Through the transforming processes, the orthogonal coordinates of the inputs is transformed into the spherical coordinates. Accordingly, the clipping may progress toward the center of the sphere.

The first two-dimensional data transforming memory is provided since the input signals are the L*, a*, and b* color signals. Also in the third modification, if the input signals are the L*, a*, and b* color signals, that transforming memory must be provided.

In the case of the inputs of 8 bits and 7 bits and the outputs of 8 bits and 7 bits for the memory capacity of the second two-dimensional data transforming memory, the memory capacity is increased by $2^{15} \times 15/8$ bytes. To secure a good image quality, a different clipping method is allowed. The instant modification may be realized by the combination of the modified technique and the first embodiment.

A color signal transforming apparatus in which a plural number of input signals are each divided into higher bits and lower bits, and output signals are formed by calculating basic data obtained from the combinations of the higher bits and the combination of interpolation data obtained from the combinations of the higher bits and the lower bits, comprises: address translation memory means for receiving the combination of higher bits as an address signal and translating the address signal to another address signal; and lower-bit correcting means including lower-bit correction data storing means for outputting data for correcting the lower bits in response to the combination of the higher bits as an address signal, and lower-bit correction calculating means 104 for correcting the lower bits by using the output signal from the correction data storing means.

With such an arrangement, the color signal transforming apparatus can execute the following two tasks while conserving the features of Published Unexamined Japanese Patent Application No. Hei. 2-187374, and the co-pending U.S. patent application Ser. No. 07/962,351. The total memory capacity required for the color signal transforming apparatus can be further reduced.

(1) To remove the interpolation regions outside the color reproduction range or to reduce the number of interpolation regions by interpolating those regions at the interpolation level, which is comparable with that of the interpolation regions around the boundary defining the color reproduction range.

(2) To reduce the number of interpolation regions by integrating the adjacent interpolation regions having similar color transforming characteristics.

I claim:

1. A color signal transforming apparatus comprising:
   address transforming means for transforming an address signal of a combination of higher bits into another address signal;
   basic data color correction memory means for outputting basic data in response to the transformed address signal;
   lower-bit correcting means including;
      lower-bit correction data storing means for outputting data for lower-bit correction in response to the address signal of the combination of higher bits; and
      lower-bit correction calculating means for correcting the lower bits by using the output signal of said lower-bit correcting means;
   interpolation data generating means for generating a set of interpolation data on the basis of the transformed address signal output from said address transforming means and the combination of the corrected lower bits output from said lower-bit correcting means; and
   adder means for adding together the output signal of said color correction memory means and the output signals of said interpolation data generating means, thereby producing output signals.

2. The color signal transforming apparatus according to claim 1 wherein when said address transforming means receives an address signal corresponding to interpolation regions outside a closed solid consisting of planes around a color reproduction range of the output device or a closed hypersolid consisting of hyperplanes around the same, said address transforming means converges the transformed address output values on the surface of the closed solid or the closed 3. The color signal transforming apparatus according to claim 1 wherein said address transforming means performs an address transformation so that the output address signals corresponding to the received higher address signals of the adjacent interpolation regions to be integrated have qual output address values, and wherein said lower-bit correcting means performs a region processing for correcting the lower bits according to the integration of said interpolation regions.

4. The color signal transforming apparatus according to claim 1 wherein when an integrated region in the coordinates of color space is addressed, said lower-bit correction data storing means outputs lower-bit correction data for correcting the lower bits on the coordinate axis along which the regions are integrated and absolute-value correction data for correcting absolute values of on the lower bits of the remaining axes, which the absolute values are required as the result of said region integration, and wherein said lower-bit correction calculating means includes region control means for correcting the lower bits on the basis of the lower-bit correction data and the absolute value correction data.

5. The color signal transforming apparatus according to claim 4 wherein said region control means comprises a wired OR circuit which receives the lower bits to be added to the lower-bit correction data and an arithmetic circuit for receiving an output of said wired OR circuit and the absolute value correction data.

6. The color signal transfoz1ning apparatus according to claim 5 wherein said arithmetic circuit is a shift register.

7. The color signal transforming apparatus according to claim 5 wherein said arithmetic circuit is a multiplication circuit.

8. The color signal transforming apparatus according to claim 1 wherein said lower-bit correction data memory means outputs an inversion-correcting data instructing the inversion of the coordinate axis for correcting the lower bits when the transformed address values are converged on the surface of the closed solid or closed hyper solid, and said lower-bit correction calculating means comprises controller for controlling the inversion of the coordinate axis with reference to the inversion-correcting data.

9. The color signal transforming apparatus according to claim 8 wherein said controller comprises an invertor for inverting the data output from said region control means and an incrementor for incrementing the output of said invertor.

* * * * *

UNITED STATES PATENT AND TRADEMARK OFFICE
CERTIFICATE OF CORRECTION

PATENT NO. : 5,337,166
DATED : August 09, 1994
INVENTOR(S) : Hiroaki IKEGAMI

It is certified that error appears in the above-indentified patent and that said Letters Patent is hereby corrected as shown below:

*Claim 2, column 21, line 50, after "closed" insert --hypersolid--.

Claim 3, column 22, line 6, "qual" should read --equal--.

*Claim 4, column 22, line 17, delete "on".

Claim 6, column 22, line 29, "transfozling" should read --transforming--.

Signed and Sealed this

Eighteenth Day of April, 1995

*Attest:*

BRUCE LEHMAN

*Attesting Officer*  Commissioner of Patents and Trademarks